(12) United States Patent
Gould et al.

(10) Patent No.: US 8,752,057 B1
(45) Date of Patent: Jun. 10, 2014

(54) TECHNIQUES FOR SYNCHRONIZING PROCESSING OF AT LEAST TWO CODE THREADS

(75) Inventors: Christopher M. Gould, Leominster, MA (US); Peter J. McCann, Mason, NH (US)

(73) Assignee: EMC Corporation, Hopkinton, MA (US)

( * ) Notice: Subject to any disclaimer, the term of this patent is extended or adjusted under 35 U.S.C. 154(b) by 1405 days.

(21) Appl. No.: 12/215,904

(22) Filed: Jun. 30, 2008

(51) Int. Cl.
*G06F 9/52* (2006.01)

(52) U.S. Cl.
CPC .................................... *G06F 9/52* (2013.01)
USPC ........................................................ 718/102

(58) Field of Classification Search
None
See application file for complete search history.

(56) References Cited

U.S. PATENT DOCUMENTS

| 6,058,460 | A * | 5/2000 | Nakhimovsky | 711/153 |
| 2004/0060049 | A1* | 3/2004 | Mendoza et al. | 718/100 |
| 2005/0080963 | A1* | 4/2005 | Schopp | 710/200 |
| 2005/0081204 | A1* | 4/2005 | Schopp | 718/100 |
| 2006/0117316 | A1* | 6/2006 | Cismas et al. | 718/103 |
| 2009/0328041 | A1* | 12/2009 | Sudzilouski | 718/100 |

OTHER PUBLICATIONS

McCann, et al., "Techniques for Inter-User-Space Communication", U.S. Appl. No. 12/079,759, filed Mar. 28, 2008.
McCann, et al., "Techniques for User Space and Kernel Space Communication", U.S. Appl. No. 12/079,822, filed Mar. 28, 2008.
McCann, et al., "Logical Device Model", U.S. Appl. No. 12/215,917, filed Jun. 30, 2008.

* cited by examiner

*Primary Examiner* — Robert Fennema
*Assistant Examiner* — William B Partridge
(74) *Attorney, Agent, or Firm* — Muirhead and Saturnelli, LLC

(57) ABSTRACT

Described are techniques synchronizing processing of at least two code threads. A first thread executing in user space is provided. A second thread executing in kernel space is provided. A global mutex lock is provided for synchronizing processing between said first thread and said second thread. One of said first thread and said second thread holds the global mutex lock and is identified as a current owner of the global mutex lock. The other of said first thread and said second thread requests the global mutex lock and is blocked until the current owner of the global mutex lock releases the global mutex lock. The global mutex lock is held by at most one thread at a point in time and is identified as the current owner.

20 Claims, 16 Drawing Sheets

TECHNIQUES FOR SYNCHRONIZING PROCESSING OF AT LEAST TWO CODE THREADS

CROSS REFERENCE TO RELATED APPLICATIONS

This application is related to U.S. patent application Ser. No. 12/215,917, filed on even date herewith, to P. McCann et al., U.S. patent application Ser. No. 12/079,759, filed Mar. 28, 2008, TECHNIQUES FOR INTER-USER-SPACE COMMUNICATION, and U.S. patent application Ser. No. 12/079,822, filed Mar. 28, 2008, TECHNIQUES FOR USER SPACE AND KERNEL SPACE COMMUNICATION.

BACKGROUND

1. Technical Field

This application generally relates to scheduling and synchronization, and more particularly to techniques used for providing synchronization between code modules as may be used during code execution.

2. Description of Related Art

Computer systems may include different resources used by one or more host processors. Resources and host processors in a computer system may be interconnected by one or more communication connections. These resources may include, for example, data storage devices such as those included in the data storage systems manufactured by EMC Corporation. These data storage systems may be coupled to one or more servers or host processors and provide storage services to each host processor. Multiple data storage systems from one or more different vendors may be connected and may provide common data storage for one or more host processors in a computer system.

A host processor may perform a variety of data processing tasks and operations, using the data storage system. For example, a host processor may perform basic system I/O (input/output) operations in connection with data requests, such as data read and write operations.

Host processor systems may store and retrieve data using a storage device containing a plurality of host interface units, disk drives, and disk interface units. The host systems access the storage device through a plurality of channels provided therewith. Host systems provide data and access control information through the channels to the storage device and the storage device provides data to the host systems also through the channels. The host systems do not address the disk drives of the storage device directly, but rather, access what appears to the host systems as a plurality of logical disk units. The logical disk units may or may not correspond to the actual disk drives. Allowing multiple host systems to access the single storage device unit allows the host systems to share data in the device. In order to facilitate sharing of the data on the device, additional software on the data storage systems may also be used.

A data storage system environment may consist of a wide variety of different hardware and software. For example, a data storage system may use a variety of different operating systems, hardware platforms, file systems, and the like. Problems may arise in connection with development of new code modules as well as for existing code modules intended for execution on data storage systems in order for the code modules to be usable in the different environments.

Thus, it may be desirable to utilize a flexible architecture and framework which allows a same code module to be used in the variety of different data storage system environments.

SUMMARY OF THE INVENTION

In accordance with one aspect of the invention is a method for synchronizing processing of at least two code threads comprising: providing a first thread executing in user space; providing a second thread executing in kernel space; and providing a global mutex lock for synchronizing processing between said first thread and said second thread wherein one of said first thread and said second thread holds the global mutex lock and is identified as a current owner of the global mutex lock, and the other of said first thread and said second thread requests the global mutex lock and is blocked until the current owner of the global mutex lock releases the global mutex lock, wherein said global mutex lock is held by at most one thread at a point in time and is identified as the current owner. The global mutex lock may be used to synchronize processing between said first thread executing in a context of a first user space container, said second thread executing in a context of a kernel space container, and a third thread executing in a context of a second user space container different from said first user space container. The first thread may be a creator of the global mutex lock by executing a first call to code associated with an application programming interface to create said global mutex lock. Creating the global mutex lock in connection with said first call may include proxying a call from user space into kernel space to a third thread that performs processing to create the global mutex lock, said processing performed to create the global mutex lock including creating an operating system mutex lock in kernel space and tracking said first thread executing in a context of a first user space container as creator of the global mutex lock. The processing performed to create the global mutex lock may include creating and initializing a global mutex structure included in a list of global mutex structures, said global mutex structure including a first field identifying the current owner of the global mutex lock, a second field identifying the operating system mutex lock, a dirty indicator which is set to dirty when the current owner terminates holding the global mutex lock, and a reference count identifying a number of users of said global mutex lock. Prior to requesting the global mutex lock, an open call may be made to open said global mutex lock. The number of users may be an integer quantity formed as a sum of one, for a creator of said global mutex lock that executed said first call, and a number quantifying how many open calls are made to a point in time by threads currently executing in user space and kernel space for which no corresponding close call for said global mutex lock has been issued up to said first pointing time. Processing may be performed to deallocate resources associated with said global mutex lock when said number of current users indicates that there are no current users of said global mutex lock. Upon termination of a user space container, processing may be performed, said processing including identifying each global mutex structure in said list of global mutex structures for which said user space container is identified in the first field as the current owner, setting the dirty indicator of said each global mutex structure, and releasing the operating system mutex lock identified by said second field, said releasing causing selection of a blocked thread, if any, waiting to acquire a global mutex lock associated with said each global mutex structure to resume execution and acquire the operating system mutex lock identified by the second field to become the current owner. The processing performed upon termination of a user space container may further includes identifying each global mutex structure in said list of global mutex structures for which said user space container is identified as creator and deallocating resources associated with said each global mutex lock when said number of current users of said each global mutex lock indicates that there are no current users of said each global mutex lock. The current owner of the global mutex may be identified using information identifying a container and a thread, said container being a user space or a kernel space fault domain including said thread. The first thread may acquire the global mutex lock and becomes the current global mutex lock owner by issuing a call using a first defined interface and said second thread may request the global mutex lock by issuing a call using the first defined interface. The method may include: requesting and obtaining the global mutex lock by the first thread, the first thread being identified as the current owner of the global mutex lock; requesting the global mutex lock by the second thread while the global mutex lock is owned by the first thread, wherein said requesting by the second thread causes execution of the second thread to be blocked because another thread currently owns the global mutex lock; and releasing, by the first thread, the global mutex lock so that the global mutex lock has no current owner, wherein said releasing causes the second thread to resume execution and acquire the global mutex lock, said second thread being identified as the current owner of the global mutex lock. All global mutex locks created by threads executing in user space and kernel space may be resources associated with a logical device included in kernel space. The first thread and the second thread may perform calls using a same interface to perform operations in connection with global mutex locks including said global mutex lock. The same interface may include a first interface to create a global mutex lock, a second interface to destroy a global mutex lock, a third interface to open a global mutex lock, a fourth interface to close a global mutex lock, a fifth interface to request a global mutex lock, and a sixth interface to release a global mutex lock. The method may include: requesting and obtaining the global mutex lock by the first thread, the first thread being identified as the current owner of the global mutex lock; requesting the global mutex lock by the second thread while the global mutex lock is owned by the first thread, wherein said requesting by the second thread causes execution of the second thread to be blocked because another thread currently owns the global mutex lock; and wherein a user space container including said first thread terminates. In response to the first thread terminating, processing may be performed, said processing including: marking an indicator associated with said global mutex lock indicating that the current owner of the global mutex lock terminated while holding the global mutex lock; releasing the global mutex lock; and causing said second thread to resume execution and acquire the global mutex lock, said second thread being identified as the current owner of the global mutex lock, wherein said second thread is notified in accordance with said indicator that said global mutex lock was released as a result of a previous owner of the global mutex lock terminating while holding the global mutex lock.

In accordance with another aspect of the invention is a computer readable medium comprising executable code stored thereon for synchronizing processing of at least two code threads, the computer readable medium comprising executable code for: providing a first thread executing in user space; providing a second thread executing in kernel space; and providing a global mutex lock for synchronizing processing between said first thread and said second thread wherein one of said first thread and said second thread holds the global mutex lock and is identified as a current owner of the global mutex lock, and the other of said first thread and said second thread requests the global mutex lock and is blocked until the current owner of the global mutex lock releases the global mutex lock, wherein said global mutex lock is held by at most one thread at a point in time and is identified as the current owner. The global mutex lock may be used to synchronize processing between said first thread executing in a context of a first user space container, said second thread executing in a context of a kernel space container, and a third thread executing in a context of a second user space container different from said first user space container. All global mutex locks created by threads executing in user space and kernel space may be resources associated with a logical device included in kernel space. The first thread and said second thread may perform calls using a same interface to perform operations in connection with global mutex locks including said global mutex lock. The same interface may include a first interface to create a global mutex lock, a second interface to destroy a global mutex lock, a third interface to open a global mutex lock, a fourth interface to close a global mutex lock, a fifth interface to request a global mutex lock, and a sixth interface to release a global mutex lock. The computer readable medium may also include executable code for: requesting and obtaining the global mutex lock by the first thread, the first thread being identified as the current owner of the global mutex lock; requesting the global mutex lock by the second thread while the global mutex lock is owned by the first thread, wherein said requesting by the second thread causes execution of the second thread to be blocked because another thread currently owns the global mutex lock, and wherein a user space container including said first thread terminates. In response to the first thread terminating, processing is performed, said processing including: marking an indicator associated with said global mutex lock indicating that the current owner of the global mutex lock terminated while holding the global mutex lock; releasing the global mutex lock; and causing said second thread to resume execution and acquire the global mutex lock, said second thread being identified as the current owner of the global mutex lock, wherein said second thread is notified in accordance with said indicator that said global mutex lock was released as a result of a previous owner of the global mutex lock terminating while holding the global mutex lock.

BRIEF DESCRIPTION OF THE DRAWINGS

Features and advantages of the present invention will become more apparent from the following detailed description of exemplary embodiments thereof taken in conjunction with the accompanying drawings in which.

DETAILED DESCRIPTION OF EMBODIMENT(S)

Figure 1:
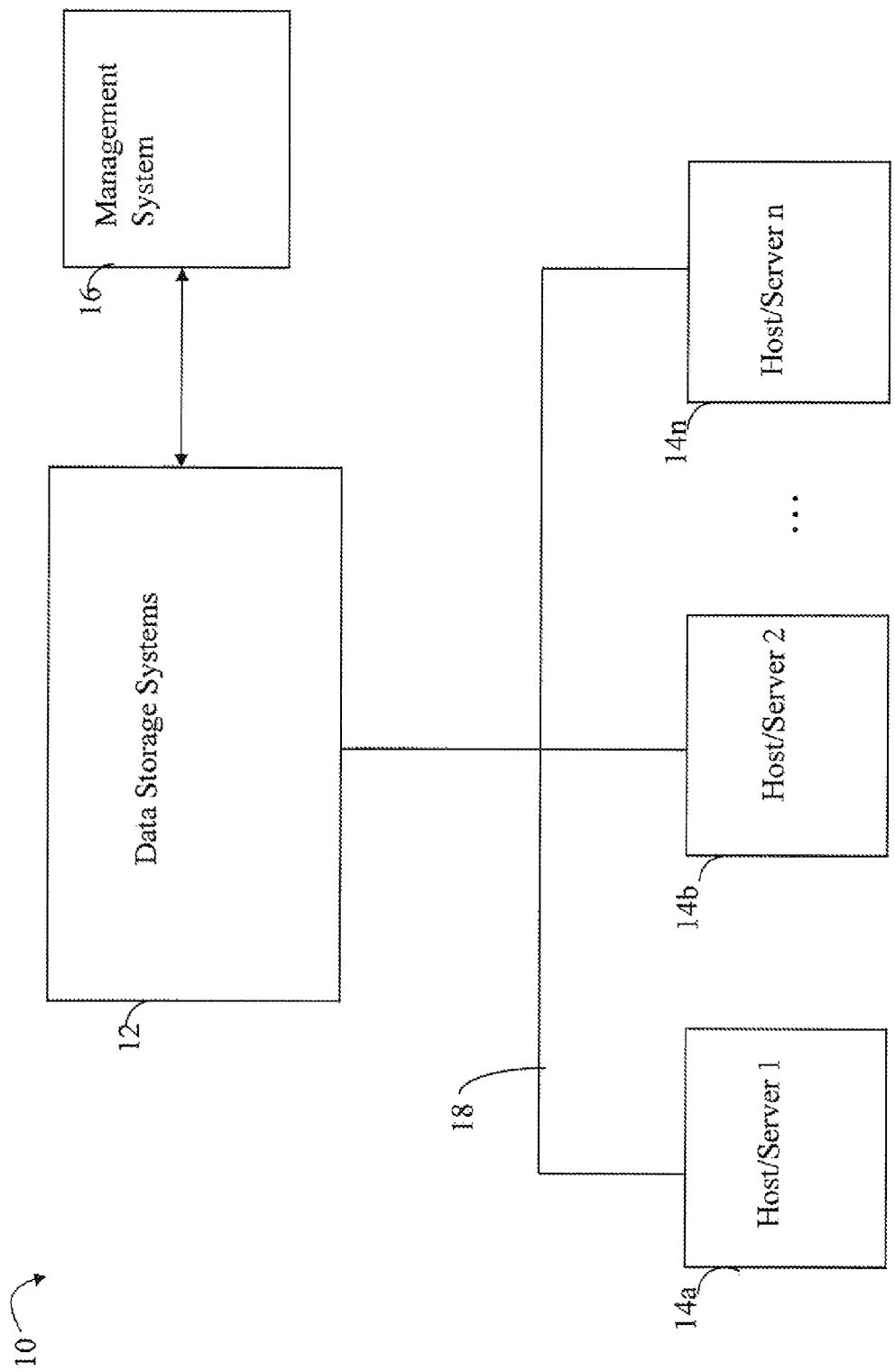
FIG. 1 is an example of an embodiment of a computer system that may utilize the techniques described herein.

With the growing popularity of all types of data storage devices, there is also a growing demand for software and features for data storage devices. However, developing software components for the devices is a difficult task because storage devices operate under constraints which at least in some cases are distinct or prioritized differently from those imposed on other types of computing systems.

For example, data storage devices require solutions to different sets of problems. A wide variety of data storage hardware solutions are available in the market. The solutions require significant efforts from software developers to provide high performance and reliability and other desired storage features and to integrate them with software solutions that would present to the end-customers easy and friendly user-interfaces. In addition, providers of hardware solutions are challenged to provide reasonable hardware-to-software interface mechanisms.

In many cases these constraints have resulted in providing largely static and non-expandable programming environments for data storage devices. The programming environments for these devices also tend to lack a common or standard interface to handle the integration of software components in a data storage environment. Thus, the creation of component-oriented software is rendered difficult and becomes a custom solution. Accordingly, conventional programming and testing environments for such devices present a substantial obstacle to software developers for such devices. Adding functionality to the operating system of a storage device can be difficult. Adding the same functionality to a storage device having a different operating system may require in general not only a different set of function calls and programming methods, but a different programming environment altogether.

Examples of conventional methods providing platform independence include the CORBA (Common Object Request Broker Architecture) architecture and the JAVA™ programming language by SUN MICROSYSTEMS™. A CORBA architecture employs a middle layer called Object Request Broker ("ORB") to facilitate integration of software objects. The middle layer requires memory and a CPU's (central processing unit's) processing power.

A conventional JAVA™ architecture employs a virtual machine which provides platform independence at run-time. A virtual machine facilitates different object components to find each other, and the object components interact with each other via the virtual machine. Because object components interact and execute via the virtual machine versus execution of native code of the underlying processor, the processing speed is noticeably slowed down in a Java architecture. In addition, the virtual machine requires a large amount of memory and only executes code in user space. Furthermore, a software developer is required to use the JAVA™ language, and thus needs to expend a large amount of time and effort to become versatile in using a JAVA™ system. In addition, a large amount of legacy code mitten in non-Java language becomes unavailable in a JAVA™ architecture.

It is desirable to have flexible and platform independent programming environments for storage devices, especially given the growing demand for storage devices having a variety of different data storage system environments.

As described at least in part below, a storage software platform architecture can be provided that converges and leverages existing platform capabilities and technologies with other assets to provide a sustainable advantage.

In at least some implementations the architecture allows developers to focus on the customer experience and quality, improved product scalability, reliability, and availability, innovation in response to customer need, development of best of breed products and solutions, product line breadth, and enterprise and data center technologies. In at least some implementations the architecture also facilitates development and/or improvement in key areas such as convergence and leverage, ease of use, channel readiness, consistency and flexibility, application awareness, storage solutions and services, success at the lower end of the market, and efficiency, productivity, and focus of development resources.

In at least one aspect, the architecture is or includes a scalable, common architecture that can be extended across many technical and industry dimensions, and that takes into account that performance considerations vary, that availability and quality concerns may be high but have different complexities, that security is constant (but with perimeter versus internal security priorities varying), and that many different topologies exist. In at least one implementation, the architecture is or includes a unified architecture for integrated management of network attached storage (NAS), and object and storage block services.

The architecture may include features such as openness, application awareness, ease of use and management, partner enablement, scaling, globalization, enhanced platform architecture, and enhanced availability and reliability. Openness may rely on and/or leverage proprietary and third party technologies for accessibility and user interface. Application awareness may include automated discovery, application provisioning, and self-management. Ease of use and management may include a unified user experience, total lifecycle coverage, self-management, and active communities. Partner enablement may include features that facilitate sales channels and OEM (original equipment manufacturer) arrangements. Scaling may include a range from small and medium size businesses to enterprise, and may include scaling up and scaling out. Globalization may include fully internationalized systems, with localized user interface screens and behavior. Enhanced platform architecture may include modular building blocks and well defined interfaces. Enhanced availability and reliability may include fault domains and autonomous management.

At least one implementation of the architecture takes into account that, from a high level perspective, many different storage platforms have many of the same features, such as moving data from one I/O chip to memory to another I/O chip, high availability, clustering, peer to peer replication, and drive management, and such platforms also support similar interface protocols, transformations, and methods. However, if such platforms have significantly varying implementations and external interfaces, and little commonality, development involves significant duplication of functionality and work, and it can be difficult to move technology or techniques from platform to platform, share or reuse technology or techniques, combine technology or techniques from different platforms together or with new applications, or otherwise avoid doing the same work multiple times. For example, if a new feature or new standard is needed, the new feature or standard must be implemented separately for each platform.

A convergence-oriented common software environment based on the architecture takes into account different base architectural assumptions, different terminology for similar concepts, different behaviors or expressions for similar features, different high availability, different clustering, scaling, and non destructive upgrade models, different wire protocols (e.g., replication, mainframe), and different management interfaces and look-and-feel interfaces. As a result, the environment takes into account different software environments, different base operating systems dictating hardware, and different hardware dictating base operating systems.

Thus, the common software environment enables mechanical commonality as a prelude to enabling architectural commonality, with the results that the value of developed technology increases, commonality increases, it takes less work to maintain the same base of functions or add features, flexibility increases, the ability to effect rapid change is improved, technology and techniques are freed from existing mechanical then architectural constraints, the ability to combine existing technology and techniques with new technology and techniques in new ways increases, lost opportunity costs are regained, resources are freed up to refactor and rationalize rather than rewrite or discard current technology or techniques, the underlying basics of technology is preserved, enabling virtualization, code is strengthened by preserving field experience, development, testing, and support are made more efficient, and reliability is improved.

Referring to FIG. 1, shown is an example of an embodiment of a: system that may be used in connection with performing the techniques described herein. The system 10 includes one or more data storage, systems 12 connected to server or host systems 14a-14n through communication medium 18. The system 10 also includes a management system 16 connected to one or more data storage systems 12 through communication medium 20. In this embodiment of the computer system 10, the management system 16, and the N servers or hosts 14a-14n may access the data storage systems 12, for example, in performing input/output (I/O) operations, data requests, and other operations. The communication medium 18 may be any one or more of a variety of networks or other type of communication connections as known to those skilled in the art. Each of the communication mediums 18 and 20 may be a network connection, bus, and/or other type of data link, such as a hardwire or other connections known in the art. For example, the communication medium 18 may be the Internet, an intranet, network or other wireless or other hardwired connection(s) by which the host systems 14a-14n may access and communicate with the data storage systems 12, and may also communicate with other components (not shown) that may be included in the computer system 10. In one embodiment, the communication medium 20 may be a LAN (local area network) connection and the communication medium 18 may be an iSCSI (Internet SCSI (Small Computer System Interface)) or fibre channel connection.

Each of the host systems 14a-14n and the data storage systems 12 included in the system 10 may be connected to the communication medium 18 by any one of a variety of connections as may be provided and supported in accordance with the type of communication medium 18. Similarly, the management system 16 may be connected to the communication medium 20 by any one of variety of connections in accordance with the type of communication medium 20. The processors included in the host computer systems 14a-14n and management system 16 may be any one of a variety of proprietary or commercially available single or multi-processor system, such as an Intel-based processor, or other type of commercially available processor able to support traffic in accordance with each particular embodiment and application.

It should be noted that the particular examples of the hardware and software that may be included in the data storage systems 12 are described herein in more detail, and may vary with each particular embodiment. Each of the host computers 14a-14n, the management system 16 and data storage systems may all be located at the same physical site, or, alternatively, may also be located in different physical locations. In connection with communication mediums 18 and 20, a variety of different communication protocols may be used such as SCSI, Fibre Channel, iSCSI, and the like. Some or all of the connections by which the hosts, management system, and data storage system may be connected to their respective communication medium may pass through other communication devices, such as a device in the CONNECTRIX® family by EMC® Corporation or other switching equipment that may exist such as a phone line, a repeater, a multiplexer or even a satellite. In one embodiment, the hosts may communicate with the data storage systems over an iSCSI or a fibre channel connection and the management system may communicate with the data storage systems over a separate network connection using TCP/IP (Transmission Control Protocol/Internet Protocol). It should be noted that although FIG. 1 illustrates communications between the hosts and data storage systems being over a first connection, and communications between the management system and the data storage systems being over a second different connection, an embodiment may also use the same connection. The particular type and number of connections may vary in accordance with particulars of each embodiment.

Each of the host computer systems may perform different types of data operations in accordance with different types of tasks. In the embodiment of FIG. 1, any one of the host computers 14a-14n may issue a data request to the data storage systems 12 to perform a data operation. For example, an application executing on one of the host computers 14a-14n may perform a read or write operation resulting in one or more data requests to the data storage systems 12.

The management system 16 may be used in connection with management of the data storage systems 12. The management system 16 may include hardware and/or software components. The management system 16 may include one or more computer processors connected to one or more I/O devices such as, for example, a display or other output device, and an input device such as, for example, a keyboard, mouse, and the like. A data storage system manager may, for example, view information about a current storage volume configuration on a display device of the management system 16.

In one embodiment, the one or more data storage systems 12 of FIG. 1 may be an appliance with hardware and software for hosting the data storage of the one or more applications executing on the hosts 14a-14n. The appliance may include one or more storage processors and one or more devices upon which data is stored. The appliance may include software used in connection with storing the data of the hosts on the appliance and also software used in connection with techniques described in following paragraphs which are part of a common software environment.

In another embodiment, the data storage systems 12 may include one or more data storage systems such as one or more of the data storage systems, such as data storage arrays, offered by EMC Corporation of Hopkinton, Mass. Each of the data storage systems may include one or more data storage devices, such as disks, flash memory drives, and the like. One or more data storage systems may be manufactured by one or more different vendors. Each of the data storage systems included in 12 may be inter-connected (not shown). Additionally, the data storage systems may also be connected to the host systems through any one or more communication connections that may vary with each particular embodiment and device in accordance with the different protocols used in a particular embodiment. The type of communication connection used may vary with certain system parameters and requirements, such as those related to bandwidth and throughput required in accordance with a rate of I/O requests as may be issued by the host computer systems, for example, to the data storage systems 12. It should be noted that each of the data storage systems may operate stand-alone, or may also be included as part of a storage area network (SAN) that includes, for example, other components such as other data storage systems. Each of the data storage systems may include a plurality of disk devices or volumes. The particular data storage systems and examples as described herein for purposes of illustration should not be construed as a limitation. Other types of commercially available data storage systems, as well as processors and hardware controlling access to these particular devices, may also be included in an embodiment.

In such an embodiment in which element 12 of FIG. 1 is implemented using one or more data storage systems, each of the data storage systems may include code thereon for performing the techniques as described herein for the common software environment.

Servers or host systems, such as 14a-14n, provide data and access control information through channels to the storage systems, and the storage systems may also provide data to the host systems also through the channels. The host systems may not address the disk or other types of drives of the storage systems directly, but rather access to data may be provided to one or more host systems from what the host systems view as a plurality of logical devices or logical volumes (LVs). The LVs may or may not correspond to the actual disk drives. For example, one or more LVs may reside on a single physical disk drive. Data in a single storage system may be accessed by multiple hosts allowing the hosts to share the data residing therein. An LV or LUN (logical unit number) may be used to refer to the foregoing logically defined devices or volumes.

In following paragraphs, reference may be made to a particular embodiment such as, for example, an embodiment in which element 12 of FIG. 1 is an appliance as described above. However, it will be appreciated by those skilled in the art that this is for purposes of illustration and should not be construed as a limitation of the techniques herein.

The common software environment may include components described herein executing on each data storage system. Each of the data storage systems may have any one of a variety of different hardware and software platforms comprising a supported environment. For example, a first data storage system may include the common software environment with a first operating system and underlying hardware. A second data storage system may include the common software environment with a different operating system and different underlying hardware.

The common software environment includes a framework which may be implemented using APIs (application programming interface) and other code modules described herein. The APIs may implement the underlying functionality which varies with the different possible data storage system hardware and software platforms. As such, code may be written using the APIs so that the code is insulated from the underlying platform dependencies. The code may be executed on any data storage system utilizing the APIs regardless of the particular hardware and/or software platform of the data storage system. Additionally, the API may be written so that the code is allowed to execute in user space or kernel space as will be described in more detail herein. As such, the API may utilize the underlying primitives of the particular operating system or may also emulate functionality on an operating system lacking a particular feature. A code module using the API can also execute in user mode or kernel mode on a supported operating system. For example, a code module may make a first API call on a data storage system having a first operating system. For the first operating system, the API may implement the first API call utilizing the underlying primitives of the first operating system. The code module may also be executed on another data storage system having a second different operating system. For the second operating system, the first API call may be implemented using the primitives of the second operating system. The second operating system may not have a rich or full set of primitives so the API may emulate the necessary functionality of the primitives missing from the second operating system. The API uses the underlying operating system primitives where available and may otherwise synthesize or emulate the functionality necessary as may vary with the capabilities of each operating system. The code module may also execute in user or kernel mode on the first and second operating systems.

Figure 2:
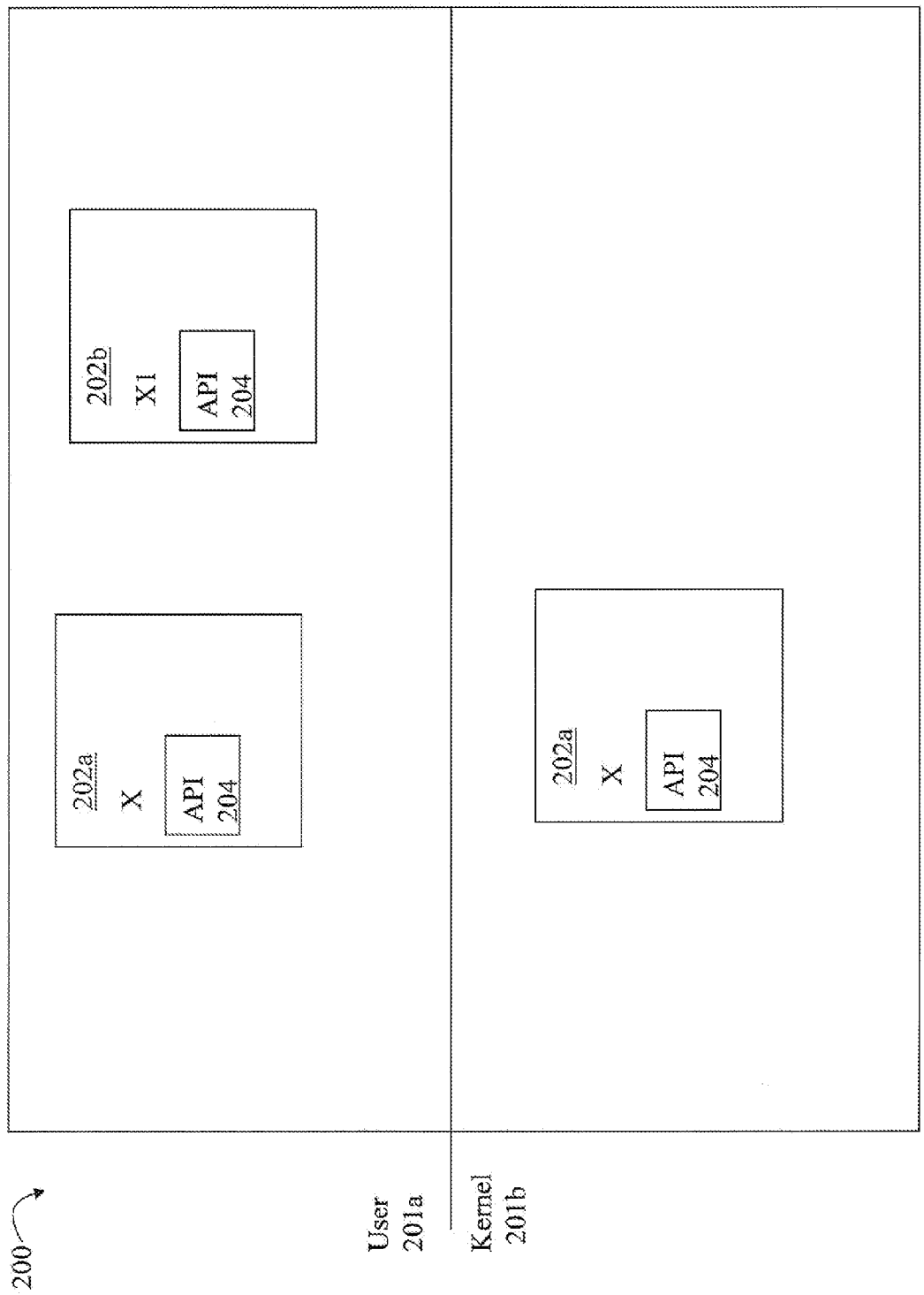
FIG. 2 is an example illustrating use of an API (application programming interface) in connection with a same code module that may be executed in user space and kernel space in an embodiment in accordance with the techniques herein.

Referring to FIG. 2, shown is an example of components that may be executing on a processor node of a data storage system. If a data storage system has multiple processors, FIG. 2 illustrates components that may be executed by each such processor. In the example 200, shown are user mode or user space 201a and kernel mode or kernel space 201b with different entities executing in each mode. As known in the art, code executing in the kernel mode may be characterized as a privileged execution mode with unrestricted access to system memory and hardware devices. Operating system code typically executes in kernel mode. In contrast, code executing in user mode may be characterized as a non-privileged mode of execution with restricted access to the system memory and hardware devices. In the example 200, each of elements 202a and 202b included in user space 201a may be a code module executing in user space, such as a user space process or container. Each of 202a and 202b executing in user space may utilize an API 204 to perform different operations. Each of 202a and 202b in user space may be a user space process or container having its own process address space. Each user space process or container may have its own process address space. Thus, each user space process may be characterized as a single container or fault domain for fault containment purposes. In other words, each user process has its own state and can have an execution fault independent of, or isolated from, other containers or fault domains as may be associated with other user space processes as well as from code executing in the kernel space described below. Therefore, when one of the user space processes experiences a fault or otherwise terminates, the other code executing in other containers (such as other user space processes) may continue to execute without being affected by the fault. When a first of the executing processes, as may be executing in user space or kernel space is notified of the failing process (as may be executing in user space), the first process may also notify other executing user and/or kernel space modules. The first process, or other currently executing user space process or kernel space code, may perform processing on behalf of the failing process and may perform cleanup associated with the failing process. In one embodiment, each user process can save information about its own state in an area of memory external to the process so that another process can perform cleanup, resume processing of the failed process, and the like. Additionally, code executing in user space or kernel space process may take steps in response to the failing process in accordance with any outstanding requests or processing being performed by the failing process. For example, a first process may reissue its request previously made to a failing user process to another user process instance performing the same services or functionality as the failing process. In contrast to user space containers, all code executing in the kernel mode may execute in the context of the same address space so that if a fault occurs during execution of a kernel mode process or thread, the operating system may experience a failure. Thus, all the code executing in kernel mode 201b may be characterized as a single kernel fault domain or container in contrast to each separate fault domain, container and associated address space for each instance of 202a and 202b executing in user mode 201a.

As illustrated, the same code module represented by element 202a may also be executed in kernel space. As will be described in following paragraphs using the common software environment herein, a code module 202a may use API 204 which implements user and kernel mode variations of necessary operations allowing the same code module 202a to execute in both user and kernel mode without modification to the original source code. In other words, for a given API call, any coding difference in implementing the API call when executing in user or kernel mode, different operating system, or other data storage system environment particular, may be embedded in the code of the API.

As will also be described in more detail herein, the API 204 may include code for one or more scheduling and synchronization primitives. Scheduling and synchronization primitives may be used for synchronization between different executing code entities and to control access to shared resources. Operations performed with respect to a synchronization primitive may be performed by making a call using an interface to code of the API 204. The API 204 may also include other code for other defined interfaces performing operations besides those in connection with the synchronization primitives described herein. In one embodiment, the API 204 may be an object-oriented API performing operations upon objects used for scheduling and synchronization. As described in more detail below, the API 204 may include code for performing operations in connection with a global mutex used to facilitate synchronization between code modules executing in different fault domains or containers such as, for example, two different user space processes or between a first process executing in user space and other code executing in kernel space.

In the example 200, the same code module 202a may execute in both user space and kernel space and use the same API 204. The underlying details implementing the functionality of the API call are embedded in the API code and not the code associated with 202a. Using the API 204, an embodiment may make a same set of functionality available to code that executes in both user and kernel space and leave the implementation details of the API calls to be included in the API code. The API may provide services to kernel space code which are implemented using, and may be otherwise only available to, code executing in user space. Similarly, the API may provide services to user space code which are implemented using, and may be otherwise only available to, code executing in kernel space. For example, a device driver or other code module typically executed in kernel mode may alternatively be executed in user mode with the ability to have multiple instances and allow a first instance of a driver to assist in recovery on failure of another device driver instance. As another example, during development of code that will execute in kernel mode, the code modules may be developed and executed in the user mode to facilitate debugging. At a later point once debugging is complete, the code may be executed in kernel mode unmodified.

As described above, the common software environment may include the API and other code modules to implement the framework providing the user-kernel portability as well as portability among different hardware and software platforms (e.g., different operating systems, data storage systems and underlying hardware, and the like). The common software environment may include other code provided as a layer between the API and operating system specific code, for example, to facilitate communications with devices.

As described above, the same API may be used by a code module when the code module is executed in user space, kernel space, and/or on different data storage systems having different environments such as different operating system and/or processor architecture. The code module may make API calls so that the API implements the same set of API calls to facilitate portability of the code module for execution in user space or kernel space or on any one of a variety of different software environments that may be supported in accordance with the functionality included in the API. Thus, a module coded using the API as described herein may be executed in user mode or kernel mode unmodified. Furthermore, the same module may be executed on different data storage systems having different data storage system environments provided the particular data storage system environment is supported by the API. Thus, processing dependencies that may vary with user or kernel mode as well as operating system and underlying processor architecture may be handled by the API code so that a module utilizing the API as described herein may be executed in a variety of different data storage system environments as well as user or kernel mode.

It should be noted that although the example 200 of FIG. 2 illustrates a single code module 202a included in a first U-space (user space) container, a single code module 202b included in a second U-space container and a single code module 202a included in a K-space (kernel space) container, each of the foregoing containers may include multiple code modules and multiple threads or other code execution entities.

Figure 2A:
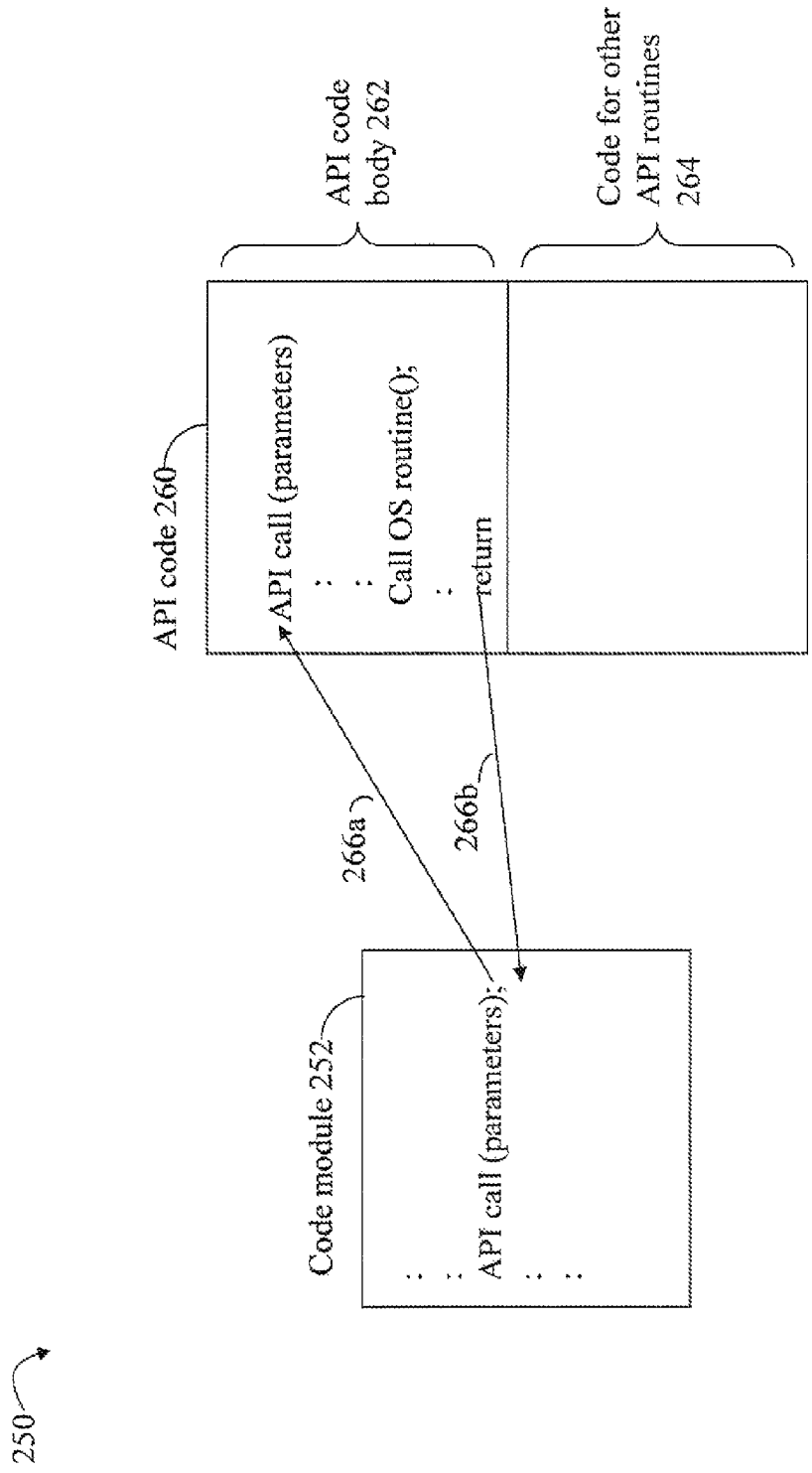
FIG. 2A is an example illustrating how code of the API may be used as a wrapper around platform-dependent calls to insulate a code module and promote portability in an embodiment using the techniques herein.

Referring to FIG. 2A, shown is an example illustrating general data flow between a code module and code of the API in accordance with techniques herein. The example 250 also illustrates the API code utilizing underlying native operating system functionality. The API code effectively provides a "wrapper" or layer of code around the underlying operating system calls that may be made to implement functionality of the particular API feature and operation. The API thus insulates the code module 252 from the different operating system specific calls that may be made to implement the API functionality providing portability of the code module across different operating systems that may be used in different execution environments. Similarly, the code module 252 is insulated from the coding differences that may occur in order to implement the API functionality in user and kernel mode. It should be noted that, as described herein, the underlying operating system functionality may vary with environment. Where a particular functionality needed to perform an operation, such as a scheduling and synchronization primitive, in connection with the API is not directly available in a native operating system, the functionality may be simulated using other functionality which is available in the native operating system.

The example 250 includes code module 252 which makes a call, "API call (parameters)", to code in the API. When the code module 252 is executed and the foregoing API call is made, control is transferred to an entry point in the API code 260 as indicated by 266a. The API code body 262 is executed and may invoke one or more operating system routines (OS routines) to implement the particular operation of the API call, such as a particular scheduling and synchronization primitive as will be described in following paragraphs. Subsequently, control is returned to the code module 252 as indicated by 266b when the API code body 262 has completed. It should be noted that in the example 250, the code module 252 calls a routine in the API. The code module 252 may be code developed to run in user mode, kernel mode, and/or in any one of a variety of different environments each having a different operating system.

As described in more detail elsewhere herein in one embodiment, the code module 252 may be executing in user space or kernel space and may be executing, respectively, in the context of a U-space or K-space container having its own address space. Code module 252 of a first U-space or K-space container may need to synchronize access to a resource or processing with another code module of a different container. For example, code module 252 may be included in a U-space container and may need to synchronize with a second code module executing in K-space. As another example, code module 252 may be executing in K-space and may need to synchronize with a second code module executing as part of a U-space container. The global mutex object and operations performed with respect to this object described herein may be used by the foregoing two code modules for purposes of synchronization between containers of different fault domains and different address spaces. The API code 260 may include code for each of the different global mutex operations and provide an interface for each of these operations represented as an API call (parameters) in FIG. 2A. The code module 252 may perform a global mutex operation by using the appropriate API call and use the code of the API to perform the processing for the global mutex operation. In accordance with the techniques herein, it should be noted that the same API may also be used when both code modules are in different U-space containers for synchronization therebetween.

Generally, the techniques herein for global mutexes may be used to coordinate and synchronize processing, access to a resource, and the like, between two or more code modules each in different containers or fault domains. As described in following paragraphs, an embodiment of the global mutex herein may be characterized as a robust global mutex by providing notification to the API code when a code module using the global mutex terminates. Thus, the API code may track current users of each global mutex and perform cleanup processing associated with the global mutex after all users of the global mutex have terminated. Such cleanup processing may include, for example, deallocating or otherwise making available or consistent, system resources associated with the global mutex which are no longer needed.

It will be appreciated by those skilled in the art that a routine in the API 260 may also be invoked by other bodies of code including, for example, another API routine, operating system code, and the like. In any case, the API routine may return to the calling routine once the called API routine has completed.

The example 250 illustrates a template in which functionality provided in the native environment, such as by an operating system, may be used by the API so that user or developer code invokes the API rather than calling the underlying operating system routines directly. Such code which invokes the API rather than directly invoking the underlying operating system routines provides portability of the developed code module across user and kernel mode as well as the different supported environments.

In accordance with the techniques described herein, a set of common interfaces may be provided using the API to perform operations in connection with a global mutex. A same code module may be executed, using the same set of common interfaces, in both user space and kernel space meaning that the same set of operations are available in user space and kernel space. The common interfaces provided for the global mutex may be implemented using code of the API to behave in a similar manner when executing code in user space and kernel space. In other words, code of the API which performs operations in connection with the global mutex may be implemented to exhibit similar runtime behavior in both user space and kernel space as well as on the different supported platforms and environments. A code module which makes calls to the API implementing operations performed in connection with a global mutex allows the code module to be portable and also exhibit the same runtime behavior (e.g. in accordance with a same set of semantics for the different operations) on different platforms as well as in user and kernel space although the operations for the global mutex may be implemented differently by the API depending on the functionality included in a native environment. As such, the code module may make calls to the API herein to ensure portability of the code across user space, kernel space, and supported environments.

The API may include code to perform operations with respect to a named global mutex object. In one embodiment, the API may include code to perform a set of operations, or methods, on each global mutex object. The API may include code and a defined interface to perform each of the operations in both user and kernel space and across the different supported environments.

The global mutual exclusion lock, or global mutex lock, object may be used to enforce mutual exclusion to a critical region of code or a resource since only one thread at a time can hold the lock. Acquisition of the global mutex lock is required prior to entering a critical region of code and the global mutex lock is released upon exiting the critical region of code. An embodiment of the API may include, for example, operations to instantiate (e.g., create) a global mutex lock, acquire the global mutex lock and release the global mutex lock. If the global mutex lock cannot be acquired by a thread, the thread is blocked and may enter a wait or sleep state until the global mutex lock becomes available. A blocked thread waiting on a global mutex lock is awakened or signaled when the lock becomes available upon release by another thread currently holding the global mutex lock, or when a current lock owner or holder terminates. Thus, the global mutex lock may be used for purposes of synchronization between threads or other code entities of different containers or fault domains as well as between threads within the same container, fault domain, or address space (e.g., threads in the same U-space container or K-space container). It should be noted that a description regarding lock ownership or current lock holder is described in more detail elsewhere herein.

In one embodiment, the API may provide interfaces and include corresponding code for the following global mutex operations where the first parameter "name" may be an identifier, such as a string or handle identifying the named global mutex object:

create gmutex (name)—to create a global mutex object identified by the first parameter "name";

destroy gmutex (name)—to destroy a global mutex object identified by the first parameter "name". If successfully executed, the name global mutex object is no longer available for use by code modules.

open gmutex (name, &reference)—to open a global mutex object identified by the first parameter "name". A code module opens a global mutex object to attach to a global mutex object prior to executing a lock operation using the global mutex object. A handle or identifier for the global mutex is returned by the parameter "reference".

close gmutex (reference)—to close a global mutex object identified by the first parameter "reference". A code module closes a global mutex object to effectively unattaches from the global mutex object indicating that the code module does not intend to execute any further lock operations for synchronization using the using the global mutex object. The parameter reference is the global mutex identifier returned from a previous open gmutex API call.

lock gmutex (reference)—to request the lock associated with the global mutex object identified by the first parameter "reference" as returned from a previous open gmutex API call. With the lock operation, the requester attempts to acquire the lock on the global mutex object to become the current holder of the lock. Only a single code entity at a time can acquire the lock. If a requester performs a lock operation using this API and another has the lock for the global mutex, then the requester waits or is blocked until the current holder releases the lock such as by invoking the unlock gmutex API. A waiting or blocked requester may also acquire the lock when the current holder terminates.

unlock gmutex (reference)—to unlock or release a global mutex object identified by the first parameter "reference" as returned from a previous open gmutex API call. This operation is performed by a current holder of the lock associated with the named global mutex object subsequent to a prior lock operation. A code module or code execution entity, such as a thread, performing the unlock operation removes the code module or entity as the current holder of the lock. Subsequently, the operating system selects one of the others, if any, waiting to acquire the lock for the global mutex. The selected code entity then resumes execution and becomes the current lock holder or owner.

It should be noted that the global mutex object as described herein may be used for inter-container synchronization or synchronization between code modules, threads, and like, in two or more different containers or fault domains. An embodiment may define or identify a lock owner using one or more data items. In one embodiment, a lock owner or holder of a particular global mutex lock may be identified using a unique lock identifier associated with the particular global mutex, a container identifier, and a thread or other code entity identifier. Thus, lock ownership and operations with respect to the global mutex object may be performed with this in mind. For example, an embodiment may issue an error message if a same thread issues consecutive lock gmutex API calls. In other words, a first thread may successfully execute a lock gmutex API call for a named global mutex object. The first thread may then attempt to execute another lock gmutex API call when the first thread is already the current lock holder, and the API code may accordingly perform processing, such as, for example, issue an error message. The global mutex lock may be used to ensure synchronization between two or more threads or executing code entities where each of the two or more threads are in the same or in different containers with respect to others of the two or more threads.

In one embodiment, different operations and associated API calls in connection with global mutex locks may be allowable on a per container basis or a per thread basis. In following description, each global mutex operation may be performed using a corresponding appropriate API call as described herein. To illustrate, consider a container with 3 threads, A, B, and C. As a first rule defining allowable operations for global mutexes, an embodiment may allow any thread in the same container to destroy a global mutex that was created by any thread in the same container. To illustrate, thread A may create a global mutex using the create gmutex API call and any thread in the container may be allowed to execute a destroy gmutex API call. Thus, the create and destroy API calls and operations for a global mutex may be performed on a per container basis independent of which thread in a container created the global mutex. Operations performed with respect to the first rule may use the lock identifier and container identifier and ensure that the thread performing the destroy operation is included in the same container as the thread which performed the create global mutex operation.

As a second rule defining allowable operations for global mutexes, an embodiment may allow any thread in a container to open a global mutex using the open gmutex API call and any other thread in the same container may be allowed to perform any of the operations of close, lock or unlock. To illustrate, assume thread A performs the open gmutex API call for a global mutex. Thread B may execute lock and unlock operations using the API calls for the global mutex and thread C may similarly execute lock and unlock operation as well as a close gmutex API call. Thus, once a thread in a container has opened a global mutex, any thread in the same container may be allowed to perform a close, lock or unlock operation with respect to that global mutex. Operations performed with respect to the second rule may use the lock identifier and container identifier and ensure that the thread performing the operation is included in the same container as the thread which performed the open global mutex operation.

A third rule defining allowable operations for global mutexes relates to lock and unlock operations which may be characterized as being on a thread level. To illustrate, assume thread A has opened a global mutex and then thread A performs a lock operation on the global mutex. Thread B requests the global mutex and is blocked since A already has the global mutex lock as the current owner or holder. Thus, lock and unlock operations may be allowed on a per thread basis so that a thread that is a lock owner in a container may block another thread in the same container which attempts to acquire the global mutex lock. Lock ownership and the operations of lock and unlock may use the lock identifier, container identifier, and thread identifier in processing.

It should be noted that as a variation to the second rule above, an embodiment may alternatively require each thread in the container to perform an open operation on a global mutex rather than allow the operations of close, lock and unlock to be performed by any thread included in a container once any thread in the container has opened the global mutex. It will be appreciated by those skilled in the art that additional information and additional logical processing may be performed to implement this second rule variation.

Figure 3:
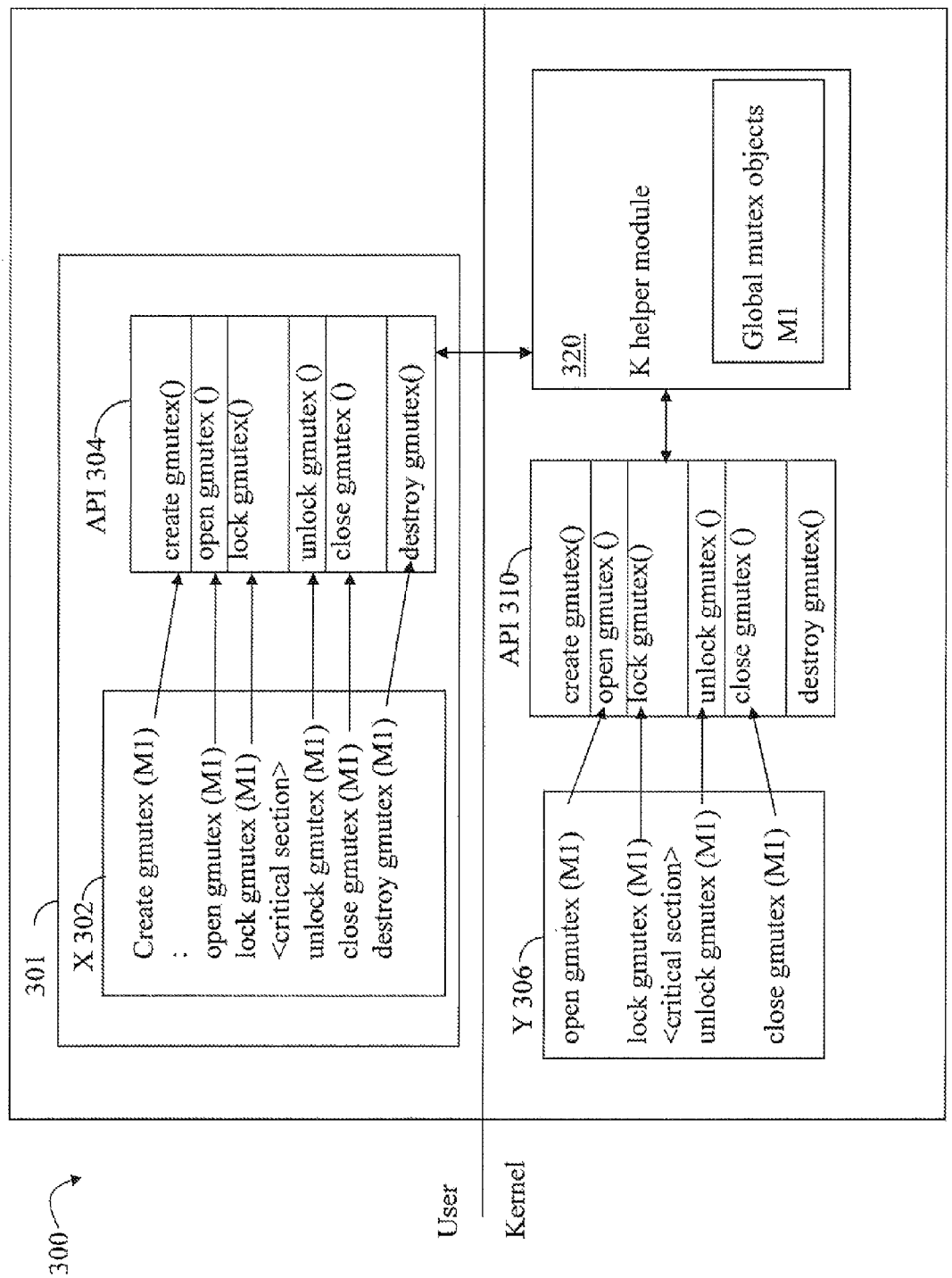
FIG. 3 is an example illustrating use of the global mutex API in connection with the techniques herein for synchronization between code executing as a U-space container and code executing as a K-space container in an embodiment in accordance with the techniques herein.

Referring to FIG. 3, shown is an example illustrating use of the API calls for performing operations in connection with the global mutex object in one embodiment. The example 300 includes user space process or container 301. Executing in the context and address space of user space container 301 are code module X 302 and API 304. Code module 302 may perform API calls to code in API 304 in connection with using a global mutex M1 to synchronize with code of K-space module Y 306 described below. In this example, synchronization between modules 302 and 306 may be desirable to provide mutually exclusive access to a critical section of code (denoted <critical section> in FIG. 3). Such mutually exclusive access may be desirable for a variety of different reasons as will be appreciated by those skilled in the art. For example, such mutually exclusive access may be needed in cases where a resource, such as a data structure, is used by two or more code modules of different containers to provide mutually exclusive access on a per-thread or per-code execution entity, basis. For purposes of this example, each code module may correspond to a single thread although a code module may have multiple corresponding threads. For example, each of elements 302, 306, and 320 may correspond to a different thread.

Executing in kernel space in the context of a single K-space container or address space are code module Y 306, API 310 and the kernel helper (K-helper) module 320. Code module 306 may perform API calls to code in API 310 in connection with using a global mutex M1 to synchronize with code of U-space module X 302 as mentioned above. In one embodiment described herein, K helper module 320 may be used in connection with managing the global mutex objects. Any U-space or K-space container can create a global mutex object. All global mutex objects and operations performed in connection with the global mutex object may be directed to the K helper module 320. Thus, if a global mutex object is created by a U-space container, the create call from the U-space container is directed via the API 304 to the K helper module 320 which creates and manages the global mutex objects in K-space. In accordance with techniques described herein in one embodiment, all global mutex objects may be created by module 320. By directing all subsequent U-space and K-space API calls to module 320, module 320 can manage the global mutex objects.

An embodiment may implement global mutex objects using a logical device where the global mutex objects are associated with the logical device. Thus, global mutex operations (e.g., such as create, lock, unlock, and the like, described above with the API for global mutex operations) may be performed with respect to the logical device for a named global mutex object. The K helper module 320 may be characterized as a provider of the logical device associated with the global mutex objects and includes code using in connection with implementing the requested global mutex operations made via corresponding API calls. Code modules of the different U-space and/or K-space containers, such as modules 302 and 306, may be characterized as consumers of the logical device associated with one or more named global mutex objects.

As will be described in more detail below, an embodiment may use the techniques described in U.S. patent application Ser. No. 12/215,917, filed Jun. 30, 2008, entitled LOGICAL DEVICE MODEL (also referred to as the LOGICAL DEVICE MODEL patent application), to P. McCann et al., which is incorporated by reference herein. As described in the LOGICAL DEVICE MODEL patent application, the logical device model includes a provider API and a consumer API. Operations performed in connection with implementing the provider and consumer APIs may use the intermodule communication techniques to facilitate communications between between different containers as described in U.S. patent application Ser. No. 12/079,759 (the '759 application), filed Mar. 28, 2008, TECHNIQUES FOR INTER-USER-SPACE COMMUNICATION, and U.S. patent application Ser. No. 12/079,822 (the '822 application), filed Mar. 28, 2008, TECHNIQUES FOR USER SPACE AND KERNEL SPACE COMMUNICATION, both of which are incorporated by reference herein. The foregoing techniques may be used in connection with inter module communication as needed for a logical device model regarding consumers and providers executing in different containers in user space and/or kernel space. As described in the LOGICAL DEVICE MODEL patent application, the API may also provide interfaces for use by consumers and providers of logical devices in accordance with an embodiment of a logical device model. As described in the '759 and '822 patent applications, the API may also include interfaces defined and used to facilitate inter-module communication between two code modules in two different containers executing in user mode (U-U communication), or between a first code module of a first container that executes in user mode and a second code module of a second container that executes in kernel mode (U-K and K-U communication). A first code module initiates a transaction or a command request and invokes a second code module. The first code module may also be referred to as a client and the second code module may be referred to as the server. In accordance with the techniques described in the foregoing two patent applications, U-U communications may be utilized when both client and server are different user mode processes or containers, U-K communications may be utilized when the client executes in the context of user mode container and the server executes in the context of the kernel mode container, and K-U communications may be utilized when the client executes in the context of the kernel mode container and the server executes in the context of a user mode container. In connection with the techniques herein, the consumer may be a client which issues requests to the provider as a server and the appropriate intermodule communications may be used depending on the particular mode (e.g., user U or kernel K) of each of the consumer and provider. It should be noted that in connection with communications when both client (such as a consumer) and server (such as a provider) execute in a same container or address space as with K-K communications or when both are included in the same U-space container, communications between such code modules may utilize local procedure calls available for communication within the same container or address space.

Thus, one embodiment in accordance with the techniques herein may include an API with a first set of code and associated interfaces used to perform the different global mutex operations as described above. The API may include a second set of code and associated interfaces used for the logical device model as described in the LOGICAL DEVICE MODEL patent application for a provider API and a consumer API. The API may also include a third set of code and associated interfaces as described in the '759 and '822 patent applications for performing intermodule communications between different containers (e.g., U-U, U-K and K-U). The interfaces of the first set of code in the API may be called by code to perform global mutex operations. The first set of code in the API may, in turn, use other code included in the API to perform the global mutex operations. In particular in an embodiment described herein, the first set of code may perform other intra-API calls (e.g., code of a first API routine performs a call to a second routine having other code within the API) using code of the second set. In turn, code of the second set may perform other intra-API calls using code of the third set just described. It will be appreciated by those skilled in the art that the foregoing is just one way in which the techniques described herein may be implemented. Other embodiments may use other techniques for global mutex object management and associated operations than as described herein for purposes for illustration.

In connection with the example 300, module X 302 is illustrated as including different global mutex API calls. Each API call from 302 results in a transfer of control to the appropriate code portion in the API 304. In turn, code for the API 304 communicates with the K-helper module 320 as needed in accordance with particular global mutex operation requested for a given API call. Similarly, the code module Y 306 is illustrated as including different global mutex API calls. Each API call from 306 results in a transfer of control to the appropriate code portion in the API 310. In turn, code of the API 310 communicates with module 320 as needed in accordance with the particular global mutex operation requested for a given API call. As described above, each of the APIs 304 and 310 may provide a same common interface for use by 302 and 306 but the underlying code in the API which implements a same API call may vary.

In the example 300, the module X 302 creates a global mutex M1 and then performs different operations with respect to the global mutex object M1. Such operations illustrated are open gmutex, lock gmutex, unlock gmutex, and close gmutex. Subsequently, the global mutex M1 is destroyed. The module 306 also uses the global mutex M1 and performs the following operations with respect to the global mutext object M1: open gmutex, lock gmutex, unlock gmutex, and close gmutex.

Example 300 illustrates only one possible ordering and usage of the global mutex API calls as may be included in an embodiment. During execution, only one of code modules 302 and 306 will execute code included in the <critical section> through synchronization using the global mutex lock and unlock operations as provided through the corresponding API calls indicated.

When an API call from U-space container 301 is directed to the K-space code module 320, the API call may also be characterized as being proxied from the U-space container 301 to the module 320. As described in the LOGICAL DEVICE MODEL patent application and the '759 and '822 patent applications, the appropriate U-K (user to kernel) communication technique may be used to facilitate the foregoing proxy of the U-space call to K-space. It should be noted that, as also described in the foregoing LOGICAL DEVICE MODEL patent application and '759 and '822 applications, other techniques may be used to facilitate communications between code of 306, 310 and 320 for local K-space communication within the K-space container.

As described below, the K helper module 320 may perform processing to manage global mutex objects, for example, to facilitate cleanup processing in the event that a U-space container terminates as may be the case, for example, with an unexpected execution fault. Furthermore, an embodiment using the techniques as described in the LOGICAL DEVICE MODEL patent application and the '759 and '822 patent applications is also provided with notification upon the occurrence of a U-space container terminating so that steps may be taken to perform the cleanup processing.

What will now be described are additional details in connection with an embodiment that uses a logical device associated with global mutex objects as managed by the K helper module 320. For purposes of illustration, reference will also be made to the code modules and other particulars in the example 300 of FIG. 3.

The K helper module 320 may be characterized as a kernel-resident module that is loaded with the kernel infrastructure as part of kernel initialization, for example, as part of start up processing in an operating environment using the techniques herein. As part of this initialization processing, the K helper module 320 may issue an API call to create a logical device as a provider of the logical device.

Figure 4:
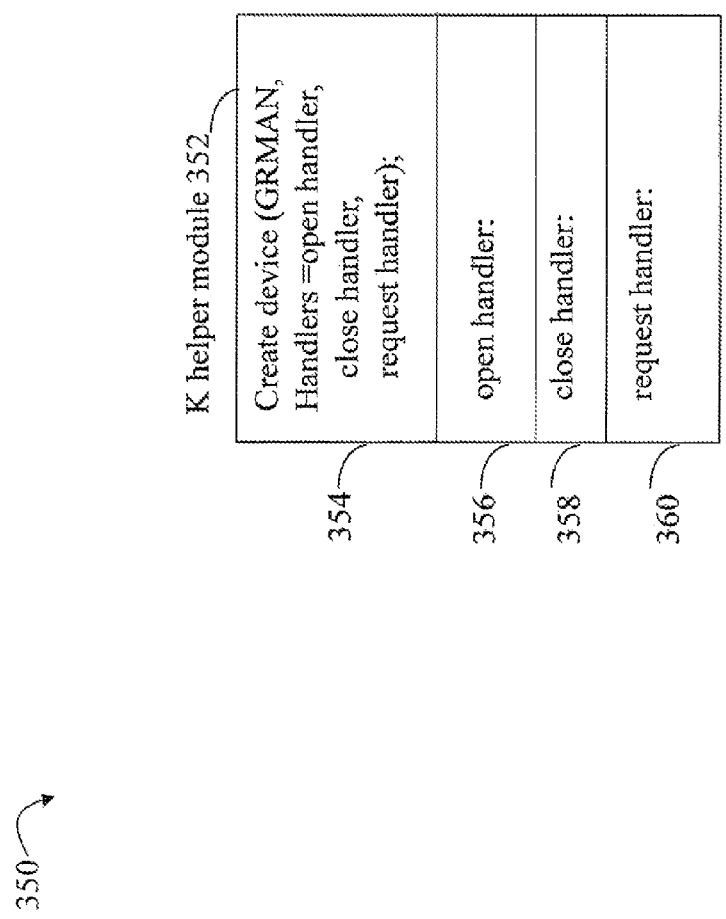
FIG. 4 is an example illustrating code portions of the K helper module of FIG. 3 in an embodiment in accordance with the techniques herein.

Referring to FIG. 4, shown is an example representing code portions that may be included in an embodiment of the K helper module 352. The code module 352 may include code portions 354, 356, 358 and 360. As described in the LOGICAL DEVICE MODEL patent application, the module 352 as a provider may utilize the create device provider API call as illustrated in 354 which creates the logical device, GRMAN, in this example, and establishes the handlers which are invoked in response to particular consumer API calls for the logical device GRMAN. Each of the handlers: open handler, close handler and request handler, refers to an entry point in code of the module 352 to which control is transferred in response to a consumer of the logical device performing, respectively, an open device, close device, and send request consumer API call.

As part of initializing each U-space container and the K-space container, the container executes the open device consumer API call for the GRMAN logical device. The foregoing is done for each container and associated address space.

Figure 5:
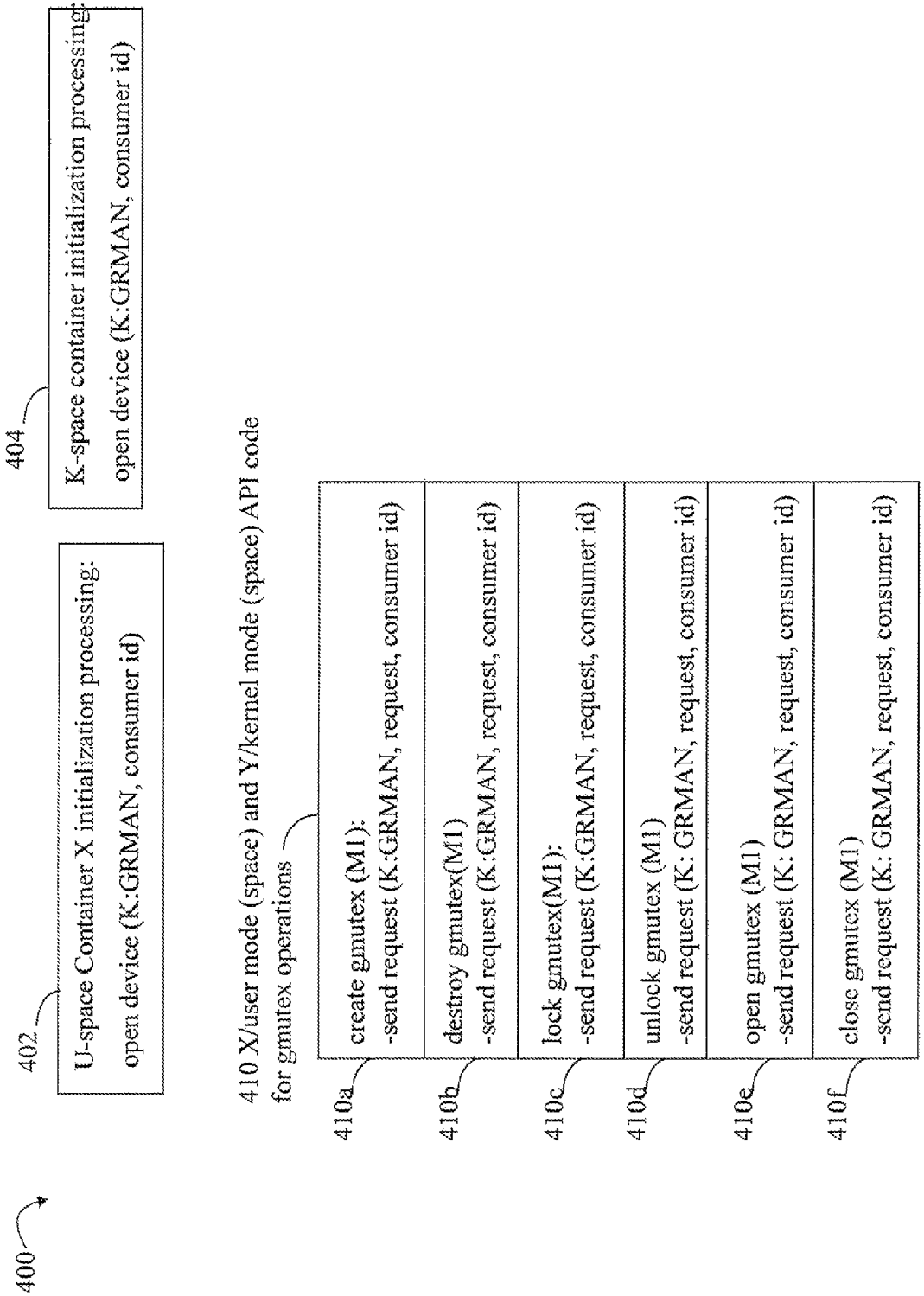
FIGS. 5 and 6 outline logical processing steps that may be performed in an embodiment in accordance with the techniques herein.

Referring to FIG. 5, shown is an example illustrating in more detail logical processing that may be performed by code modules in connection with the techniques herein in an embodiment. The example 400 includes a code portion 402 which illustrates the open device consumer API call that may be executed as part of initialization for the U-space container X. Similarly, code may be executed as part of K-space initialization processing as illustrated by 404.

It should be noted that, as described in the LOGICAL DEVICE MODEL patent application, each provider of a logical device may be a code module included in a container having its own logical device name space so that when specifying the name of the logical device as the first parameter of the open device consumer API call, the first parameter may include information identifying the container which provides or is otherwise the creator of the logical device (e.g., has executed the create device provider API call), as well as information identifying the logical device. The second parameter, consumer id, may be provided a value by code of the open handler routine in the K helper code module as described in more detail in the LOGICAL DEVICE MODEL patent application and elsewhere herein. With reference to 402 and 404, "K" in the first parameter of the open device calls identifies the K-space container as the provider of the logical device and "GRMAN" identifies the logical device.

At some later point, code of the U-space module X and K-space module Y as described in connection with FIG. 3 may perform API calls to perform global mutex operations resulting in a transfer of control to appropriate portions of the API code as illustrated in 410. The API code of 410 may represent code included in the U-space API and K-space API of an embodiment. Element 410a is a code portion of the API invoked as a result of an invocation of the create gmutex API call. Element 410b is a code portion of the API invoked as a result of an invocation of the destroy gmutex API call. Element 410c is a code portion of the API invoked as a result of an invocation of the lock gmutex API call. Element 410d is a code portion of the API invoked as a result of an invocation of the unlock gmutex API call. Element 410e is a code portion of the API invoked as a result of an invocation of the open gmutex API call. Element 410f is a code portion of the API invoked as a result of an invocation of the close gmutex API call. As illustrated, each of the foregoing API code portions 410a-410f may use the send request consumer API call as described in the LOGICAL DEVICE MODEL patent application to send a request to K-space as the provider of the logical device GRMAN. As described in more detail below, the send request consumer API call may result in sending a request from a U-space container to the K-space container including the K helper module. The U-K intermodule and inter-container communication technique described in the 759 and '822 patent applications may be used in an embodiment to send the request in connection with each of the logical device consumer API calls of 410.

Figure 6:
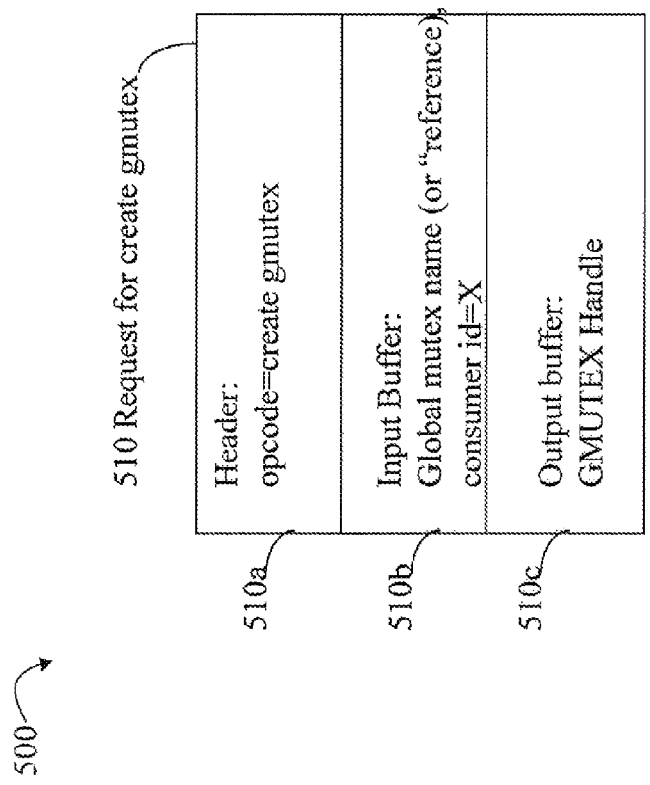

Referring to FIG. 6, shown is an example illustrating information that may be included in a request transmitted in a consumer API send request call of 410. The example 500 illustrates an exemplary request 510 that may be used in connection with a send request API call of 410a for create gmutex illustrated in FIG. 4. However, it will be appreciated by those skilled in the art that a general format for the request described may also be used in connection with requests for the other send request consumer API calls of 410b-410f of FIG. 4.

The request 510 may include a header 510a, an input buffer 510b and an output buffer 510c. A request may have any one of a variety of predefined data formats in accordance with a type of request. In one embodiment using the techniques herein, the request may have one or more predefined formats used for performing different calls or requests. Information used to identify the particular format or layout of the request may be included in the header. The format of a request used in connection with the techniques herein may have a particular predefined format as illustrated in 510. A request 510 may include a header portion 510a, an input buffer 510b and an output buffer 510c. It should be noted that each request may include additional portions and information than as described herein for purposes of illustration of the techniques herein.

The header 510a may include information that varies with the request to identify operations performed in connection with the request by the provider. For example, the header 510a may include an operation code (opcode) uniquely identifying the request format and also uniquely identifying the operation to be performed for the request instance. For example, an embodiment may include a predefined enumerated set of opcodes which includes a unique opcode for each global mutex operation corresponding to one of the 6 gmutex API calls described herein. The input buffer 510b may include input parameters, if any, and the output buffer 510c may include output parameters or results, if any, returned for the requested operation. For example, the input buffer 510b may include information identifying the global mutex object, and the consumer id uniquely identifying the consumer container X in this example. The output buffer 510c may include a handle or reference (e.g., GMUTEX HANDLE which may be a pointer) to the created global mutex object having the name identified in 510b. As described herein, the handle, also referred to as the "reference" parameter in API calls described above, to the global mutex object may be used in connection with other global mutex operations and API calls (e.g, lock, unlock and close) rather than the name to identify the particular global mutex object. Alternatively, an embodiment may perform additional processing to map and track a global mutex name to a particular handle once created so that the API calls may use the global mutex name rather than the handle for the created global mutex object. For example, the open and create gmutex API calls may take as an input parameter a name for the global mutex object and return a handle which is subsequently used in the remaining 4 gmutex API calls described herein.

In connection with other requests sent using the send request consumer API as illustrated in 410 of FIG. 5, the information in 510a-510c may vary. For example, the opcode included in 510a may vary with the particular gmutex API call and the corresponding global mutex operation to be performed.

As mentioned above, the K helper module performs processing to manage and create the global mutex objects. In one embodiment, the K helper module may keep track of each global mutex object created and may also record information regarding usage of each global mutex object. The K helper module may also track information for each container as a client or consumer of the GRMAN logical device such as, for example, which global mutex objects have been created and opened for each container. It should be noted that in following paragraphs, reference may be made using terminology that interchangeably refers to each container as a client or consumer of the GRMAN logical device. The foregoing structures and processing that may be performed by the K helper module are described in more detail in following paragraphs and figures.

Figure 7:
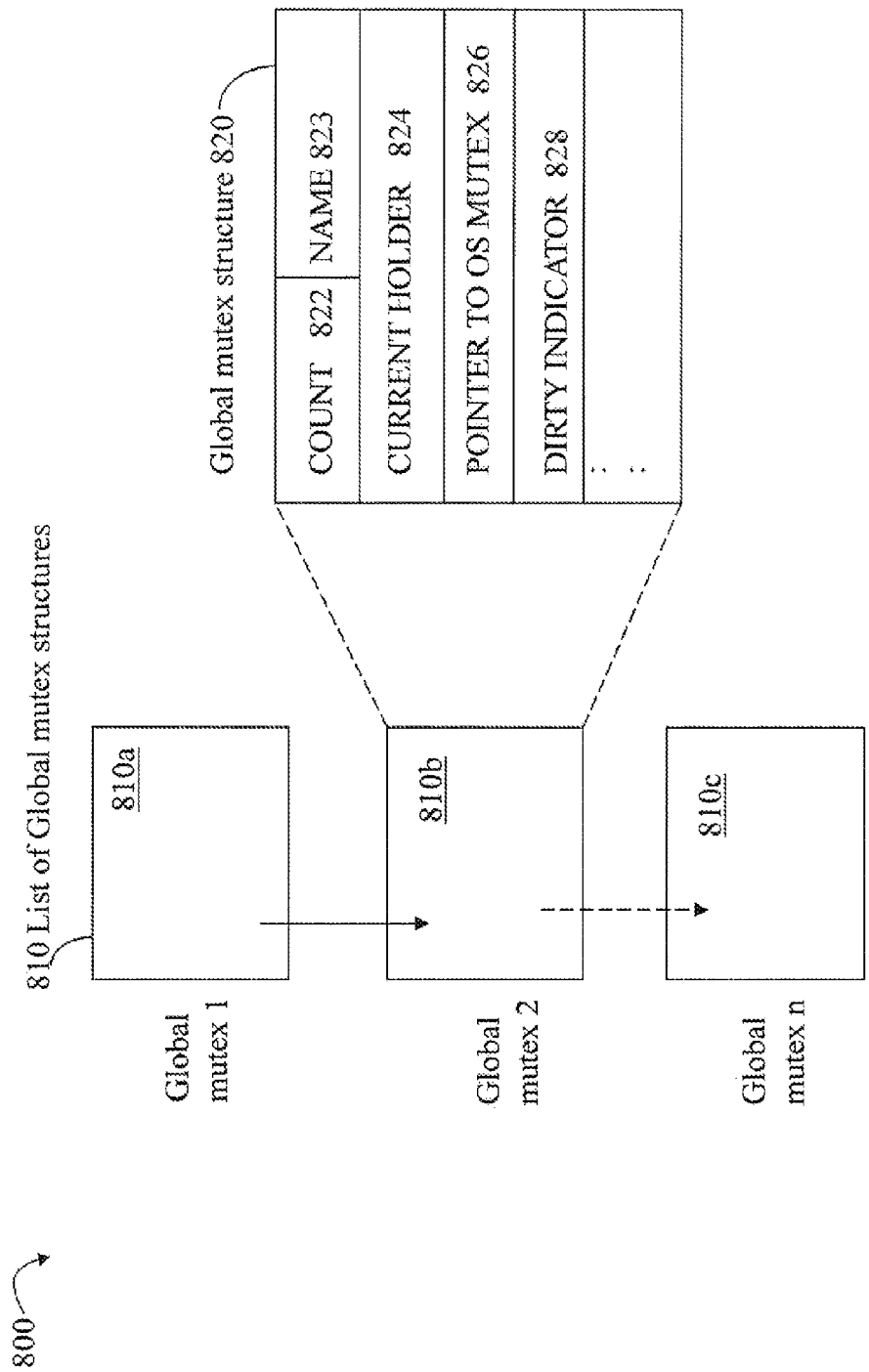
FIGS. 7 and 8 are representations of structures that may be used in connection with managing global mutex objects in an embodiment in accordance with the techniques herein.

Referring to FIG. 7, shown is an example of a structure that may be created and used by the K helper module in connection with the global mutex objects in an embodiment performing the techniques herein. The example 800 includes a list 810 in the form of a linked list of global mutex objects or structures 810a-810n, one for each global mutex object. It will be appreciated that although a singly linked list is illustrated, any one of a variety of different data structures may be used to track the information described herein. Element 820 represents in more detail information that may be included in each global mutex object or structure. Element 820 includes a count 822, name 823, a current holder 824, a pointer to OS mutex 826, a dirty indicator 828, and optionally other information. Count 822 may represent an integer quantity regarding a number of current users of the global mutex object. In one embodiment, a current user at a point in time may be a container that has issued a create gmutex API call or an open gmutex API call specifying the particular global mutex. A container that has issued a create gmutex API call is deemed no longer a current user once the container has issued a destroy gmutex API call. Similarly, a thread within a container that has issued an open gmutex API call may be deemed no longer a current user once any thread in that container has issued a close gmutex API call. The name 823 may identify the name of the global mutex. Current holder 824 may identify the current holder of the lock associated with the global mutex object. In other words, in accordance with semantics associated with the different gmutex APIs and operations described above, current holder 824 identifies at a point in time the most recent container and thread within the container that has successfully executed the lock gmutex API and has not yet executed the unlock gmutex API. Current holder 824 may indicate that no container currently holds or owns the lock for the global mutex. As described elsewhere herein in an embodiment, a current holder of a lock may be identified using different data items including a unique lock identifier (e.g., reference parameter) of the particular global mutex, a container identifier, and a thread or other code entity identifier identifying the entity which executed the lock operation to acquire the lock and become the current lock owner. The data items of the container identifier and thread or other code entity identifier may be stored in the portion of 820 represented by 824 to identify the current holder for the global mutex lock associated with structure 820. In one embodiment, the lock identifier may be the pointer 826 as described below.

It should be noted that in one embodiment, the create gmutex API call may return first a handle which is a pointer to an instance of the foregoing global mutex structure 820. In response to an open gmutex API call, a second different handle (denoted as the "reference" parameter described elsewhere herein) may be returned such that each instance of an open gmutex API call results in a different value for "reference" being returned to facilitate identification of each different open gmutex API call. For example, the different values for the "reference" parameter returned from the open gmutex API call may be used to facilitate differentiating between different open instances for the same global mutex as may be the case when different threads each issue an open gmutex API call. To summarize, for each global mutex there can be only one value for the foregoing first handle (for the creator) and any number of references (one per open operation).

Element 826 identifies the pointer to the OS (operating system) mutex object. In one embodiment, the global mutex objects may be implemented on top of, or using, underlying OS primitives. In the embodiment described herein, the OS native mutex and associated OS native operations may be used to implement the global mutex objects. As such, information may be maintained in the structure 820 for any such native OS objects. Element 828 may be a boolean value indicating whether the state of the global mutex is dirty or not. As described herein, a U-space container may terminate while holding the global mutex lock. The foregoing may occur when the failed U-space container terminates abnormally and the techniques herein provide for notification to the K helper module when this occurs. As such, the K helper module may determine that the global mutex object is then considered dirty and accordingly set the dirty indicator. The dirty indicator may be used to communicate additional information to a subsequent requester who acquires the dirty global mutex object through execution of the lock gmutex API call. For example, the failed U-space container may have left a data structure used by those acquiring the lock in an invalid or incomplete state, for example, if the U-space container was abnormally terminated while updating the data structure. As such, the dirty indicator may be used to inform the subsequent requester acquiring the global mutex lock so that the subsequent requester may take steps to possibly reconstruct or otherwise place the data structure in a valid and usable state.

It should be noted that each entry in the list 810 may be as illustrated and described in connection with element 810*b*.

Figure 8:
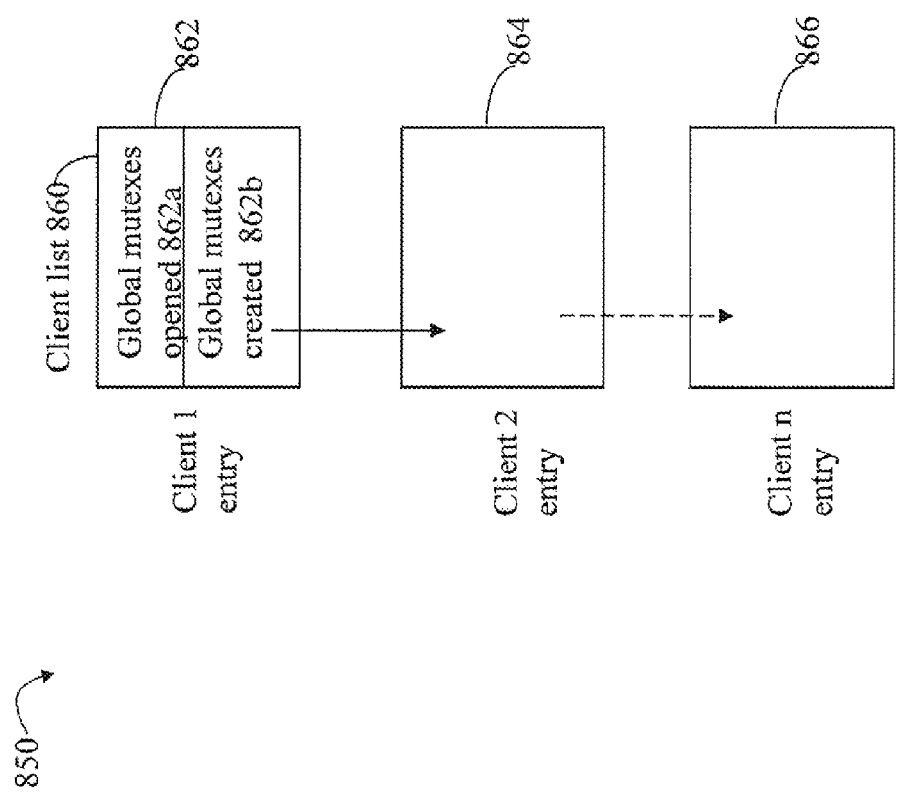

Referring to FIG. 8, shown is an example of a structure that may be created and used by the K helper module in connection with tracking information for each consumer, or container, of the GRMAN logical device in an embodiment performing the techniques herein. The example 850 includes a list 860 in the form of a linked list of entries or structures 862-866, one for each consumer. Each container may be characterized as a client or consumer with respect to the resources of the GRMAN logical device. In one embodiment described herein, the resources are the global mutex structures or objects used in implementing global mutex locks. It will be appreciated that although a singly linked list is illustrated, any one of a variety of different data structures may be used to track the information described herein. Each entry in the list 860 may identify in 862*a* the one or more global mutex objects which the consumer has opened using the open gmutex API. For each global mutex object opened, the information included in 862*a* may further identify the thread of the client container which executed the open gmutex API call and/or any other information that may be used to track and identify an instance of the open gmutex API for this client. Element 862*b* may identify the one or more global mutex objects which the consumer has created using the create gmutex API. For each global mutex object created, the information included in 862*b* may further identify the thread of the client container which executed the create gmutex API call and/or any other information that may be used to track and identify an instance of the create gmutex API for this client. Each of 862*a* and 862*b* may be logically represented in the form of a list or other structure. For example, element 862*a* may be a list with an entry for each open gmutex API call made by a thread executing in the context of the container identified by the client entry 862. Each entry in the list of 862*a* may include information identifying the thread that executed the open gmutex API call and information identifying the global mutex structure of the global mutex opened. Other suitable arrangements and structures known to those skilled in the art may be used in an embodiment than as just described. The information of 850 may be used in connection with performing any necessary cleanup processing should a U-space container terminate. In one embodiment, each of 862*a* and 862*b* may be in the form of a list of pointers to global mutex objects as included in the structure 810 of FIG. 7. It should be noted that each entry in the client list 860 may have a format as described in connection with entry 862.

Use of the foregoing structures of FIGS. 7 and 8 is described below in connection with code of the K helper module.

What will now be described are logical processing steps that may be performed by the different handlers of the provider, the K helper module, of the logical device GRMAN used to create, manage and implement the global mutex objects and operations. As described above, the K helper module executes the create device provider API call and establishes an open handler, close handler, and request handler, each of which are invoked in response to a consumer of the logical device GRMAN performing, respectively, the open device, close device, and send request consumer API calls. Reference may be made to the structures of FIGS. 7 and 8 in following paragraphs.

Figure 9:
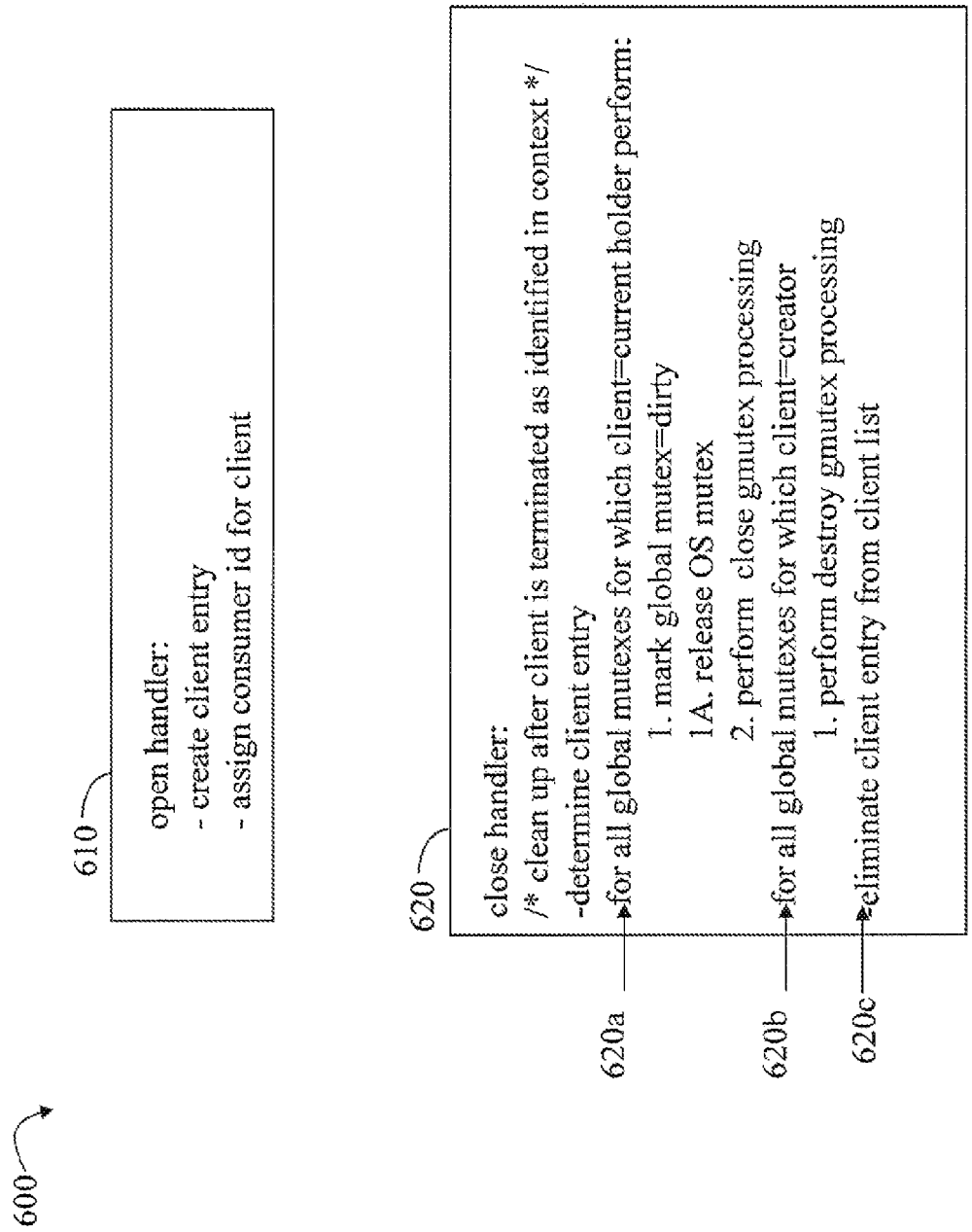
FIGS. 9, 10A and 10B outline additional logical processing steps that may be performed in an embodiment in accordance with the techniques herein.

Referring to FIG. 9, shown is an example illustrating processing that may be performed by the open handler and close handler of the K helper module. The example 600 provides additional detail regarding elements 356 and 358 of FIG. 4. Element 610 describes logical processing that may be performed by the open handler. Element 610 indicates that the open handler may create a new entry in the client list 860 of FIG. 8 for the container as a consumer or client of the GRMAN logical device. Step 610 may also include assigning a consumer id for the client that may be used to identify the corresponding entry in the client list 860 for a particular client.

Element 620 describes logical processing that may be performed by the close handler. The close handler 620 may be provided with context information regarding the container or client that has terminated. Such context information may be provided by the operating system and may identify the particular consumer, such as by communicating the consumer id or other information used to identify the failed container and its corresponding entry in the list 860 of FIG. 8. At 620*a*, for all global mutexes which the client is identified as the current holder, the global mutex is marked as dirty, the underlying native OS mutex structure is released, and close gmutex processing is performed, such as by invoking the close gmutex API described herein. In other words, the client was terminated prior to executing the close operation for the global mutex so the close handler, as part of clean up, performs such processing to effect the close operation for the global mutexes. It should be noted that the global mutexes identified in step 620*a* may be those global mutex structures in the list 810 of FIG. 7 which identify the terminated container in the current holder field 824. At 620*b*, for all global mutexes which the client is identified as the creator, destroy gmutex processing is performed, such as by invoking the destroy gmutex API described herein. In other words, the client as the creator of the global mutex was terminated prior to executing the destroy operation for the global mutex so the close handler, as part of clean up, may perform such processing as needed. Step 620*b* may identify those global mutexes created by a thread executing in the context of the failed or terminated container. At 620*c*, the close handler may then eliminate the client entry from the client list 860.

Figure 10A:
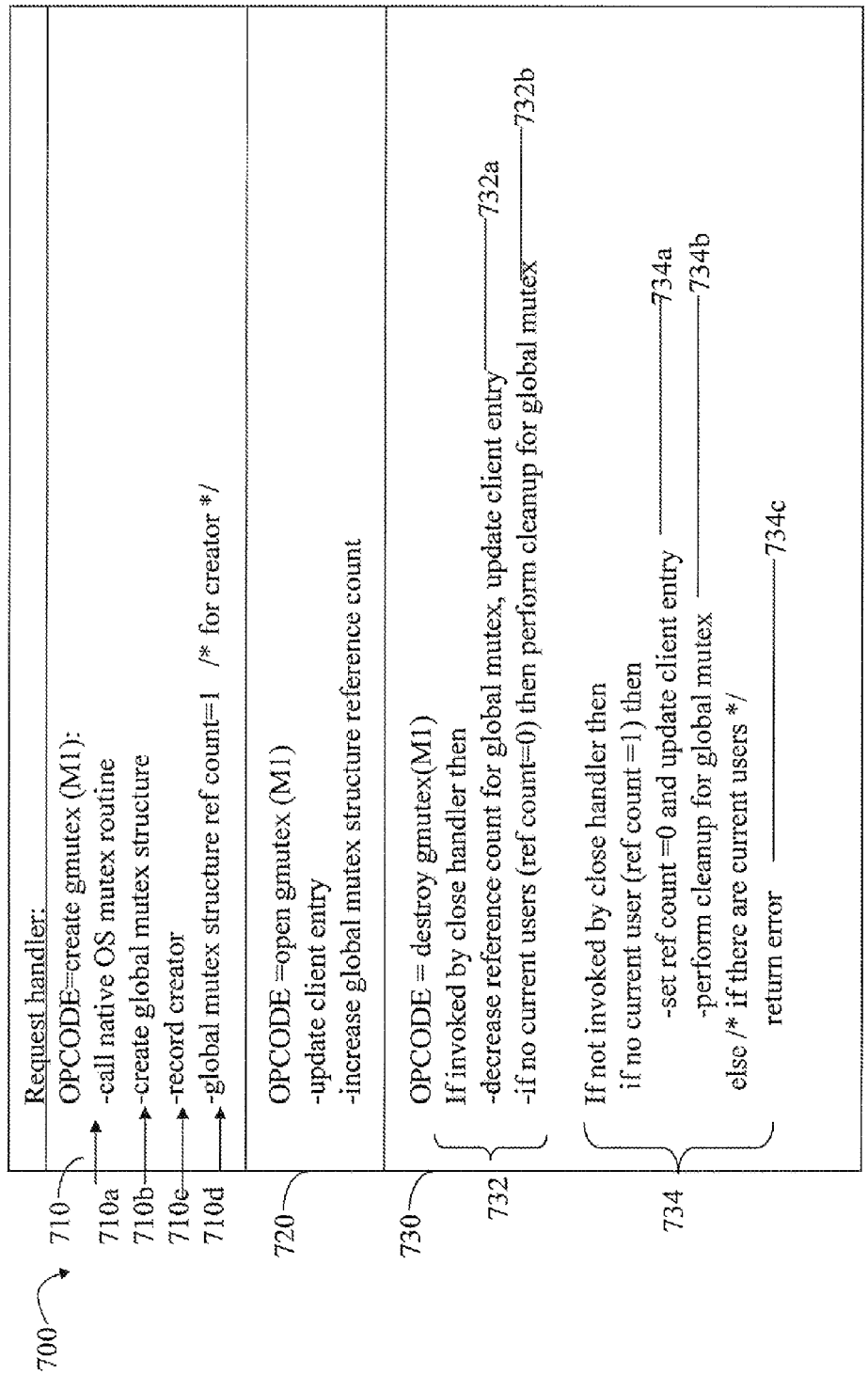
Figure 10B:
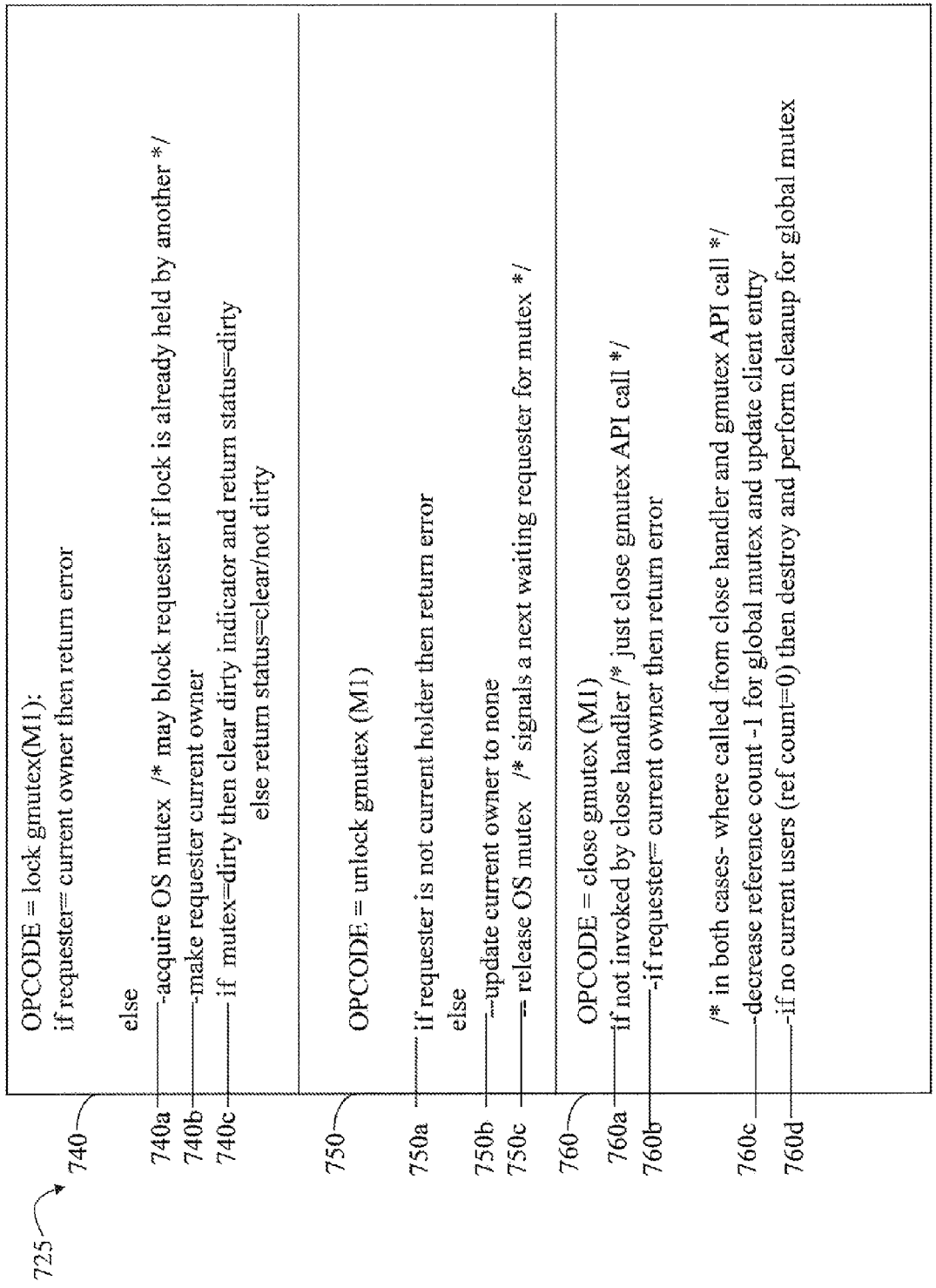

Referring to FIGS. 10A and 10B, shown are examples illustrating processing that may be performed by the request handler of the K helper module. Collectively, FIGS. 10A and 10B illustrate different code portions that may be included in the request handler of the K helper module. FIGS. 10A and 10B provides additional detail regarding element 360 of FIG. 4 and includes code portions performed in accordance with the particular opcode provided, for example, in the request header portion, corresponding to the request global mutex operation for a particular gmutex API call. Element 710 describes logical processing that may be performed for creating a global mutex object or structure. Element 710 includes invoking 710*a* the underlying native OS routines to create the native OS mutex object, creating 710*b* an entry in the list 810 of FIG. 7 for the new global mutex object and performing any initialization associated with the foregoing. Element 710 may include recording 710*c* the consumer which executed the create gmutex API call as the global mutex creator. The consumer may be identified, for example, using a consumer id provided as an input request parameter, as general context information maintained, and the like. The consumer id may be used to identify the entry in the client list 860 and update information 862*b* of that client's entry to identify the consumer or container as the creator of this global mutex object. In step 710*d*, the reference count of the global mutex structure (e.g., count 822 of FIG. 7) may be set to 1. In one embodiment, the reference count as indicated by the count field of the global mutex structure may indicate a total number of current users of the global mutex object. As described herein, current users may include the thread that executed the create gmutex API call for this global mutex and any thread that executes the open gmutex API call. As described below, when a thread executes the close or destroy gmutex API call for a global mutex, the thread is no longer considered a current user of the global mutex and the reference count may be accordingly decremented.

Element 720 describes logical processing that may be performed in connection with opening a global mutex in response to invoking the open gmutex API call. Processing of 720 may include updating the client's entry in the client list 860 of FIG. 8. The updating may include adding an entry to the list maintained in connection with field 862*a* for the client. The reference count for the global mutex is incremented to reflect the additional user that executed the open gmutex API call. Step 720 may also include performing any processing needed in connection with the OS native mutex object.

Element 730 describes logical processing that may be performed in connection with destroying a global mutex in response to invoking the destroy gmutex API call. An embodiment may only allow a creator of a global mutex to destroy the global mutex. In one embodiment, the invocation of the create global mutex API call may return a handle to the global mutex structure that differs from the handle or other identifier used in connection with open, lock, unlock and close global mutex API calls. As such, only the creator of the global mutex may be able to execute the destroy global mutex API call. Other embodiments may use other techniques to enforce the foregoing rule that only the creator of a global mutex can destroy the global mutex. Processing of 730 may include a set of logical processing steps 732 performed when control is transferred from the close handler (e.g., as part of 620*b* of FIG. 9. Processing steps 734 may be performed when control is transferred as a result of the request handler (callback) invocation in response to receiving a request including the opcode identifying the destroy gmutex (global mutex) operation as a result of invoking the destroy gmutex API call. Steps of 732 may include step 732*a* where the reference count for the global mutex is decremented by 1 and the client entry in list 860 of FIG. 8 for the client is updated (e.g., the list of maintained in connection with 862*b* may be updated to remove the global mutex therefrom). In 732*b*, if no current users of the global mutex object remain (as may be indicated with a reference count=0 for the global mutex object), then the global mutex may be removed from the list of available global mutexes and any necessary cleanup processing performed. For example 732*b* may include deallocating storage for the entry in the list 810 of FIG. 7, and performing processing to deallocate or otherwise make available for reuse any OS resource, such as related to the OS native mutex object.

Steps of 734 may include determining whether there are any current users as may be identified with a reference count=1 in this embodiment for the creator. If there are no current users, then at step 734*a* the reference count is set to 0 and the client entry for the creator may be updated as described in connection with step 732*a*. In step 734*b*, cleanup for the global mutex may be performed as described in connection with step 732*b*. If there are current users, then an error is returned at step 734*c* in response to a request to destroy the global mutex by the creator while there are still others using the global mutex.

Element 740 describes logical processing that may be performed in connection with locking a global mutex in response to invoking the lock gmutex API call. Processing of 740 may include determining whether the requester is the current lock owner or holder and if so, returning an error. If a current lock owner requests the lock, this may indicate a deadlock condition and an error is returned. Otherwise, if the requester is not the current lock owner, step 740 is performed to acquire the OS mutex. Step 740 may result in the current requester being blocked if the global mutex lock is current held by another. If there is no current owner, then control proceeds immediately to step 740*b*. If the lock is currently held by another, then the current requester is blocked at 740*a* until the operating system selects the current requester in the blocked state as the new current lock owner, such as may occur when the current owner releases the lock or terminates. At step 740*b*, the global mutex structure for the global mutex is updated to identify the current requester as the current holder or owner of the global mutex lock. Step 740*b* may include updating fields of structure 820 for the global mutex in the list 810 of FIG. 7. Step

740*b* may include updating the current holder field 824 to identify the container and thread or other code entity for the current requester. At step 740*c*, a determination is made as to whether the dirty indicator of the global mutex structure (e.g., field 828 of FIG. 7) indicates that the global mutex lock is dirty. As described elsewhere herein, the dirty indicator is set when a global mutex lock is released as a result of a terminating container or process so that the next lock owner may be accordingly signaled as to the circumstances or context under which the lock is being acquired. The next lock owner may, for example, want to know that a resource used by the previously terminated lock owner may be left in an invalid or inconsistent state. If the dirty indicator is set, the dirty indicator is cleared and a status of dirty is returned to the requester. Otherwise, if the dirty indicator is not set, a status of clear/not dirty is returned. As such, a status is returned to the requester in accordance with the setting of the dirty indicator.

Element 750 describes logical processing that may be performed in connection with unlocking a global mutex in response to invoking the unlock gmutex API call. Processing of 750 may include making a determination as to whether the current requester is the current lock holder or owner. If not, then an error is returned in step 750*a*. If the current requester is not the current lock owner, then in step 750*b* the current owner for the global mutex is updated to indicate a current owner or holder as none. Step 750*b* may include updating the corresponding entry and information in the list 810 of FIG. 7 for the global mutex object to indicate the current owner or holder as none. At step 750*c*, the current OS native mutex object may be released. Step 750*c* may result in signaling a next waiting requester waiting on the global mutex.

Element 760 describes logical processing that may be performed in connection with closing a global mutex in response to invoking the close gmutex API call. Additionally, in a manner similar to that of 730 of FIG. 10A, processing of 760 may be invoked when there is a close gmutex API call and also from the close handler (e.g., element 620 of FIG. 9). Processing of 760 may include determining 760*a* whether control was transferred from the close handler. If control was not transferred from the close handler, it means that control is transferred as a result of a close gmutex API call and a determination is made in 760*b* as to whether the current requester is the current lock holder or owner. If the current requester (e.g., thread performing the close API call) is the current lock owner, then an error is returned in step 760*b*. If control is not returned with an error status in step 760*b* or if 760 processing is being performed as a result of the close mutex API call, steps 760*c* and 760*d* are performed. At step 760*c* the reference count for the global mutex is decremented by 1 and the client entry for the container issuing the close gmutex API call is updated. Step 760*c* may include updating the appropriate entry in the list 810 of FIG. 7 for the global mutex by decreasing the reference count by 1. Step 760*c* may include updating the client entry for the container issuing the close gmutex API call in the list 860 of FIG. 8 (e.g., update the list 862*a* of the field 862 to remove an entry from the list corresponding to an open gmutex API call for the global mutex being closed). Control proceeds to step 760*d*. At step 760*d*, if there are no current users, operating system resources, such as the OS global mutex, and any API managed resources for the global mutex may be freed or made available for reuse. Step 760*d* may include performing cleanup processing as described in connection with 732*b* and 734*b*. Step 760*d* may include, for example, performing any processing needed such as deallocation of the OS native mutex object and the global mutex structure maintained by the K helper module.

What will now be described are flowcharts summarizing processing just described that may be performed in an embodiment in accordance with the techniques herein.

Figure 11:
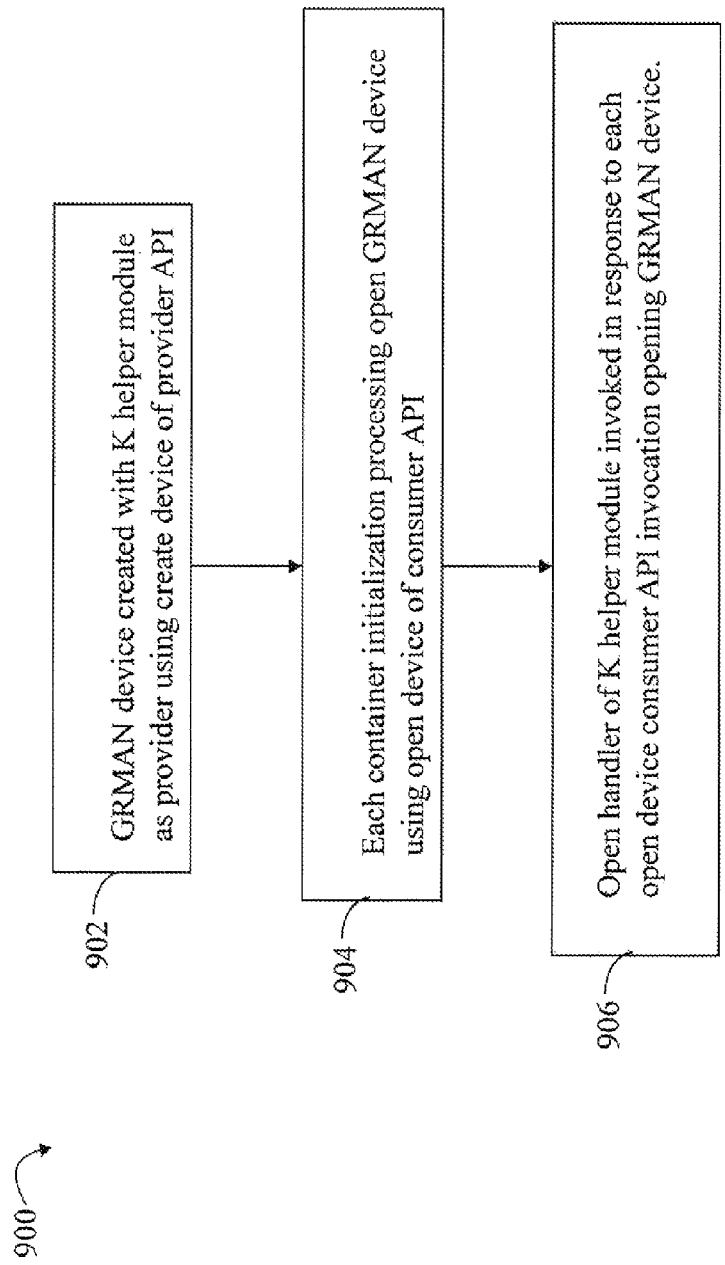
FIG. 11-13 are flowcharts describing processing steps that may be performed in an embodiment in accordance with the techniques herein.

Referring to FIG. 11, shown is flowchart 900 including processing steps that may be performed as part of initialization processing for the kernel and each user-space container in an embodiment. At step 902, the GRMAN device may be created by the K helper module as the GRMAN logical device provider. The K helper module may using the create device of the provider API for logical devices as described in the LOGICAL DEVICE MODEL patent application. As described herein, step 902 may include establishing different K helper module handlers which are invoked in response to subsequent invocations of different consumer API calls. At step 904, as part of K-space initialization and also for initialization processing of each U-space container subsequently created, an open device API call of the consumer API may be performed to open the GRMAN logical device. At step 906, in response to each invocation of the open device API, the open handler of the K helper module may be invoked.

Figure 12:
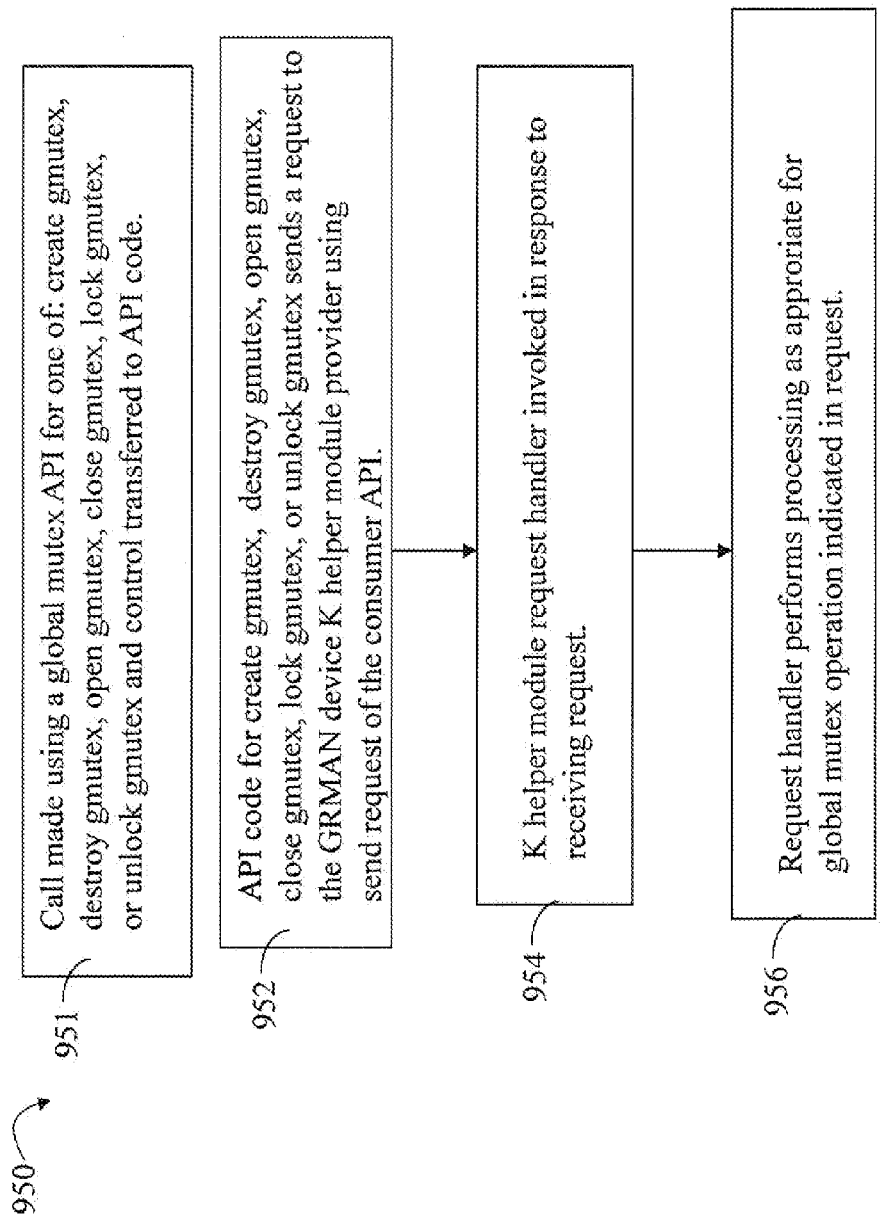

At some later point, code of a container may execute other gmutex API calls described herein. Referring to FIG. 12, shown is a flowchart of processing steps that may be performed in an embodiment in connection with invocations of the API calls for global mutex operations. At step 951, a call is made using a global mutex API for one of: create gmutex, destroy gmutex, open gmutex, close gmutex, lock gmutex, or unlock gmutex and control is transferred to the corresponding API code. At step 952, the API code prepares and sends a request as appropriate for the particular API invocation in step 951 to the GRMAN logical device provider, the K helper module. As described herein, step 952 may be performed using send request of the consumer API for logical devices. At step 954, the request handler of the K helper module is invoked in response to receiving the request. In step 956, the request handler performs processing as appropriate for the global mutex operation indicated in the request.

Figure 13:
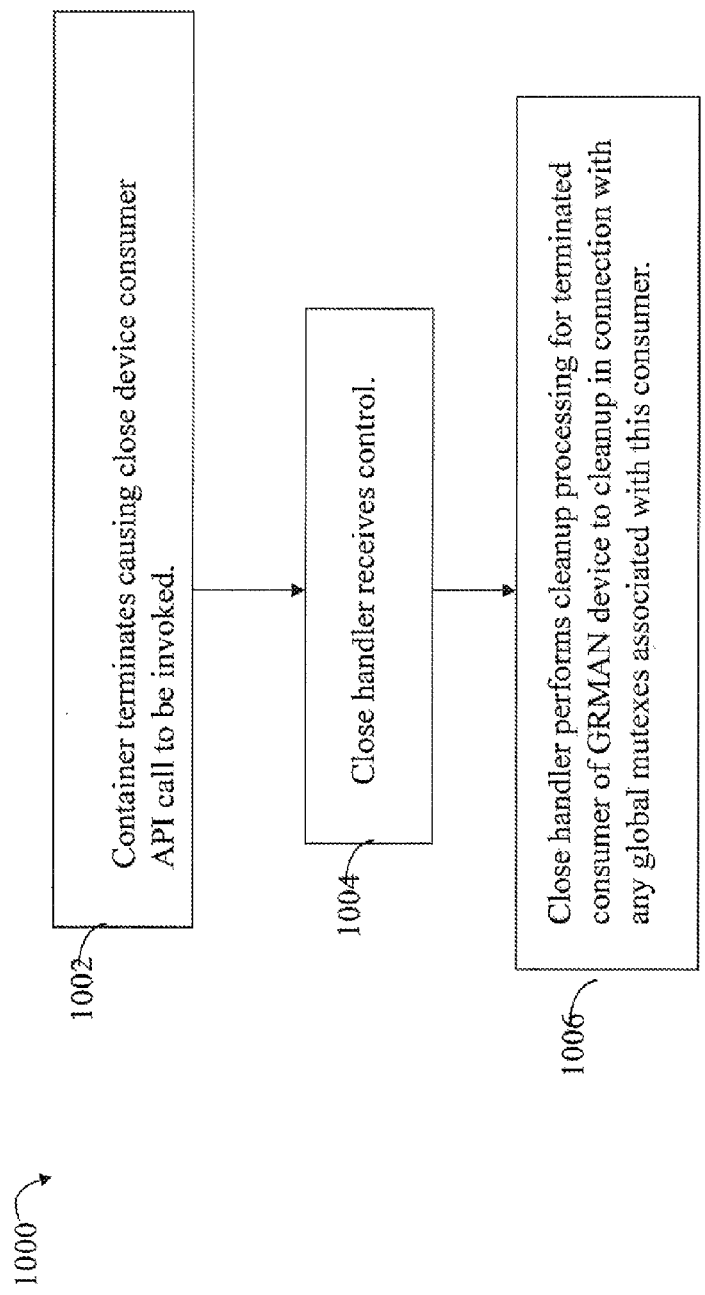

Referring to FIG. 13, shown is a flowchart of processing steps that may be performed in connection with a container terminating. At step 1002, the U-space container terminates causing the close device consumer API to be invoked. At step 1004, the close handler of the K helper module receives control. At step 1006, the close handler performs any necessary cleanup for the terminated consumer or client container.

Figure 14:
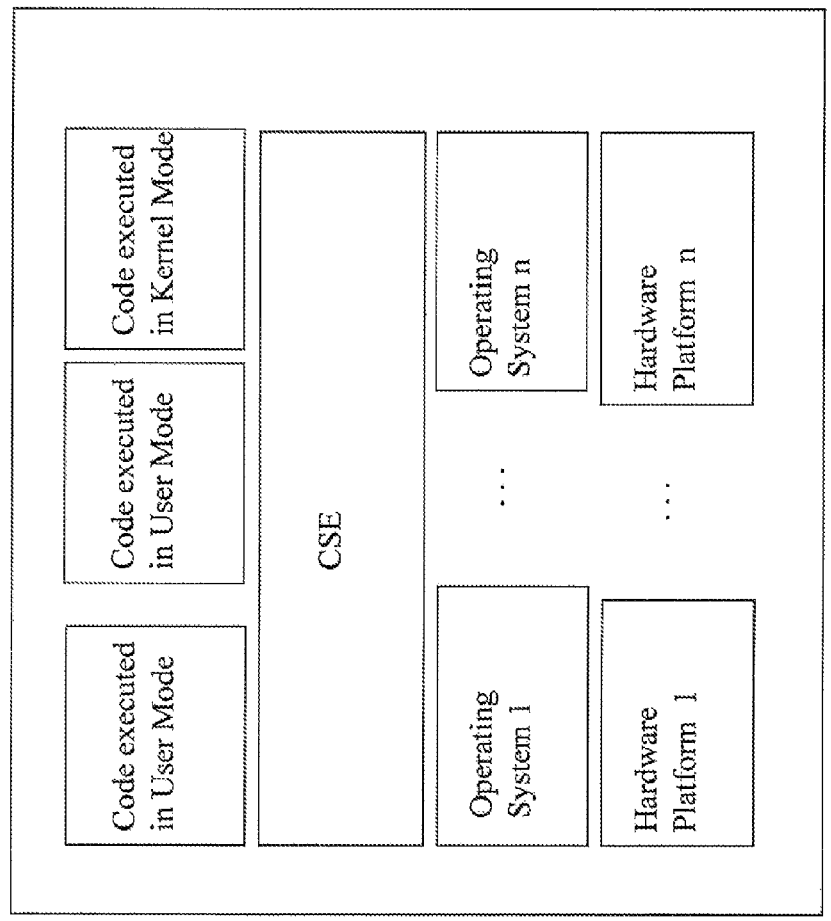
FIG. 14 is an illustration of the different operating systems and hardware platforms that may be included on a data storage system for use with the techniques herein.

Referring now to FIG. 14, shown is a representation illustrating the relationship of the common software environment (CSE) components to other components of the data storage system. In the example 1100, the CSE includes the API, and other infrastructure code used to interface code of the API to other operating system components. The CSE may isolate any code in user space (code executing in user mode) or kernel space (code executing in kernel mode) above the CSE from dependencies in the operating system or hardware platform. Furthermore, code writing using the API of the CSE may be executed in either user or kernel mode as illustrated herein.

As will be appreciated by those skilled in the art, the techniques herein may be used for existing code as well as newly developed code. For existing code, the platform specific calls may be determined and replaced with appropriate API calls. The API code may be modified to provided the necessary support for any additional platform. Similarly, new code may be developed using the API calls which may utilize the platform specific primitives while isolating the code from these platform dependencies.

It should be noted that a code module making calls into the API in accordance with techniques herein may use a first version of the API code when executing in user mode and a second version of the API code when executing in kernel mode by linking to the appropriate version. In other words, the code module makes the same API call (e.g., same defined interface) when executing in user mode and kernel mode so that the same code module can be executed in user mode and kernel mode without modification. However, the body of code included in the API which is executed as a result of the API call may vary in accordance with whether executing in user mode or kernel mode.

Using the techniques herein, an API may be used to provide a same set of semantics and functionality when implementing and providing the global mutex primitive described herein for use with code that executes in user mode, kernel mode, and across multiple supported environments. The global mutex primitive may be used to provide synchronization between code modules of two or more different containers in which each container is a U-space or K-space container. An embodiment of the global mutex primitive and operations performed in connection therewith may be characterized as robust in that it may provide for notification and clean up processing should a U-space process terminate holding a global mutex lock.

An embodiment may implement the techniques herein using code executed by a computer processor. For example, an embodiment may implement the techniques herein using code which is executed by a processor of the data storage system. As will be appreciated by those skilled in the art, the code may be stored on the data storage system on any one of a computer-readable medium having any one of a variety of different forms including volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, (DVD) or other optical storage, magnetic cassettes, magnetic tape, magnetic disk storage or other magnetic storage devices, or any other medium which can be used to store the desired information and which can accessed by a data storage system processor.

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A method for synchronizing processing of at least two code threads comprising:
providing a first thread executing in user space;
providing a second thread executing in kernel space; and
providing a global mutex lock for synchronizing processing between said first thread and said second thread wherein one of said first thread and said second thread holds the global mutex lock and is identified as a current owner of the global mutex lock, and the other of said first thread and said second thread requests the global mutex lock and is blocked until the current owner of the global mutex lock releases the global mutex lock, wherein said global mutex lock is held by at most one thread at a point in time and is identified as the current owner, wherein said first thread initiates creation of the global mutex lock and a global mutex structure associated with the global mutex lock, the global mutex structure including a dirty indicator which is set to dirty when the current owner terminates abnormally prior to releasing the global mutex lock thereby terminating while holding the global mutex lock, wherein said dirty indicator is set to indicate that the current owner terminated abnormally to notify a subsequent owner of the global mutex lock that a resource previously used by the current owner may be left in an invalid or inconsistent state.

2. The method of claim 1, wherein said global mutex lock is used to synchronize processing between said first thread executing in a context of a first user space container, said second thread executing in a context of a kernel space container, and a third thread executing in a context of a second user space container different from said first user space container.

3. The method of claim 1, wherein said first thread is identified as creator of the global mutex lock and initiates creation of the global mutex lock by executing a first call to code associated with an application programming interface to create said global mutex lock.

4. The method of claim 3, wherein creating the global mutex lock in connection with said first call includes:
proxying a call from user space into kernel space to a third thread that performs processing to create the global mutex lock, said processing performed to create the global mutex lock including creating an operating system mutex lock in kernel space and tracking said first thread executing in a context of a first user space container as creator of the global mutex lock.

5. The method of claim 4, wherein said processing performed to create the global mutex lock includes creating and initializing the global mutex structure included in a list of global mutex structures, said global mutex structure including a first field identifying the current owner of the global mutex lock, a second field identifying the operating system mutex lock, the dirty indicator, and a reference count identifying a number of users of said global mutex lock.

6. The method of claim 5, wherein, prior to requesting the global mutex lock, an open call is made to open said global mutex lock, and wherein said number of users is an integer quantity formed as a sum of one, for a creator of said global mutex lock that executed said first call, and a number quantifying how many open calls are made to a point in time by threads currently executing in user space and kernel space for which no corresponding close call for said global mutex lock has been issued up to said first pointing time.

7. The method of claim 6, wherein, processing is performed to deallocate resources associated with said global mutex lock when said number of current users indicates that there are no current users of said global mutex lock.

8. The method of claim 5, wherein, upon termination of a user space container, processing is performed, said processing including:
identifying each global mutex structure in said list of global mutex structures for which said user space container is identified in the first field as the current owner, setting the dirty indicator of said each global mutex structure, and releasing the operating system mutex lock identified by said second field, said releasing causing selection of a blocked thread, if any, waiting to acquire a global mutex lock associated with said each global mutex structure to resume execution and acquire the operating system mutex lock identified by the second field to become the current owner.

9. The method of claim 8, wherein said processing performed upon termination of a user space container further includes:
identifying each global mutex structure in said list of global mutex structures for which said user space container is identified as creator and deallocating resources associated with said each global mutex lock when said number of current users of said each global mutex lock indicates that there are no current users of said each global mutex lock.

10. The method of claim 1, wherein the current owner of the global mutex is identified using information identifying a container and a thread, said container being a user space or a kernel space fault domain including said thread.

11. The method of claim 1, wherein said first thread acquires the global mutex lock and becomes the current global mutex lock owner by issuing a call using a first defined interface and said second thread requests the global mutex lock by issuing a call using the first defined interface.

12. The method of claim 1, further comprising:
requesting and obtaining the global mutex lock by the first thread, the first thread being identified as the current owner of the global mutex lock;
requesting the global mutex lock by the second thread while the global mutex lock is owned by the first thread, wherein said requesting by the second thread causes execution of the second thread to be blocked because another thread currently owns the global mutex lock; and
releasing, by the first thread, the global mutex lock so that the global mutex lock has no current owner, wherein said releasing causes the second thread to resume execution and acquire the global mutex lock, said second thread being identified as the current owner of the global mutex lock.

13. The method of claim 1, wherein all global mutex locks created by threads executing in user space and kernel space are resources associated with a logical device included in kernel space.

14. The method of claim 1, wherein said first thread and said second thread perform calls using a same interface to perform operations in connection with global mutex locks including said global mutex lock, said same interface including a first interface to create a global mutex lock, a second interface to destroy a global mutex lock, a third interface to open a global mutex lock, a fourth interface to close a global mutex lock, a fifth interface to request a global mutex lock, and a sixth interface to release a global mutex lock.

15. The method of claim 1, further comprising:
requesting and obtaining the global mutex lock by the first thread, the first thread being identified as the current owner of the global mutex lock;
requesting the global mutex lock by the second thread while the global mutex lock is owned by the first thread, wherein said requesting by the second thread causes execution of the second thread to be blocked because another thread currently owns the global mutex lock;
and wherein a user space container including said first thread terminates, and in response to the first thread terminating, processing is performed, said processing including:
marking an indicator associated with said global mutex lock indicating that the current owner of the global mutex lock terminated while holding the global mutex lock;
releasing the global mutex lock; and
causing said second thread to resume execution and acquire the global mutex lock, said second thread being identified as the current owner of the global mutex lock, wherein said second thread is notified in accordance with said indicator that said global mutex lock was released as a result of a previous owner of the global mutex lock terminating while holding the global mutex lock.

16. A non-transitory computer readable medium comprising executable code stored thereon for synchronizing processing of at least two code threads, the computer readable medium comprising executable code for:
providing a first thread executing in user space;
providing a second thread executing in kernel space; and
providing a global mutex lock for synchronizing processing between said first thread and said second thread wherein one of said first thread and said second thread holds the global mutex lock and is identified as a current owner of the global mutex lock, and the other of said first thread and said second thread requests the global mutex lock and is blocked until the current owner of the global mutex lock releases the global mutex lock, wherein said global mutex lock is held by at most one thread at a point in time and is identified as the current owner, wherein said first thread initiates creation of the global mutex lock and a global mutex structure associated with the global mutex lock, the global mutex structure including a dirty indicator which is set to dirty when the current owner terminates abnormally prior to releasing the global mutex lock thereby terminating while holding the global mutex lock, wherein said dirty indicator is set to indicate that the current owner terminated abnormally to notify a subsequent owner of the global mutex lock that a resource previously used by the current owner may be left in an invalid or inconsistent state.

17. The non-transitory computer readable medium of claim 16, wherein said global mutex lock is used to synchronize processing between said first thread executing in a context of a first user space container, said second thread executing in a context of a kernel space container, and a third thread executing in a context of a second user space container different from said first user space container.

18. The non-transitory computer readable medium of claim 16, wherein all global mutex locks created by threads executing in user space and kernel space are resources associated with a logical device included in kernel space.

19. The non-transitory computer readable medium of claim 16, wherein said first thread and said second thread perform calls using a same interface to perform operations in connection with global mutex locks including said global mutex lock, said same interface including a first interface to create a global mutex lock, a second interface to destroy a global mutex lock, a third interface to open a global mutex lock, a fourth interface to close a global mutex lock, a fifth interface to request a global mutex lock, and a sixth interface to release a global mutex lock.

20. The non-transitory computer readable medium of claim 16, further comprising executable code for:
requesting and obtaining the global mutex lock by the first thread, the first thread being identified as the current owner of the global mutex lock;
requesting the global mutex lock by the second thread while the global mutex lock is owned by the first thread, wherein said requesting by the second thread causes execution of the second thread to be blocked because another thread currently owns the global mutex lock;
and wherein a user space container including said first thread terminates, and in response to the first thread terminating, processing is performed, said processing including:

marking an indicator associated with said global mutex lock indicating that the current owner of the global mutex lock terminated while holding the global mutex lock;

releasing the global mutex lock; and causing said second thread to resume execution and acquire the global mutex lock, said second thread being identified as the current owner of the global mutex lock, wherein said second thread is notified in accordance with said indicator that said global mutex lock was released as a result of a previous owner of the global mutex lock terminating while holding the global mutex lock.

* * * * *